US008383695B2

(12) United States Patent
Makino et al.

(10) Patent No.: US 8,383,695 B2
(45) Date of Patent: Feb. 26, 2013

(54) PHENOXY RESIN FOR OPTICAL MATERIAL, RESIN COMPOSITION FOR OPTICAL MATERIAL, RESIN FILM FOR OPTICAL MATERIAL AND OPTICAL WAVEGUIDE USING THOSE

(75) Inventors: Tatsuya Makino, Ibaraki (JP); Atsushi Takahashi, Ibaraki (JP); Toshihiko Takasaki, Ibaraki (JP); Tomoaki Shibata, Ibaraki (JP); Masami Ochiai, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 932 days.

(21) Appl. No.: 12/282,746

(22) PCT Filed: Mar. 15, 2007

(86) PCT No.: PCT/JP2007/055223

§ 371 (c)(1),
(2), (4) Date: Sep. 12, 2008

(87) PCT Pub. No.: WO2007/105795

PCT Pub. Date: Sep. 20, 2007

(65) Prior Publication Data

US 2009/0062421 A1 Mar. 5, 2009

(30) Foreign Application Priority Data

Mar. 15, 2006 (JP) ................................ 2006-070702
Jun. 16, 2006 (JP) ................................ 2006-167408

(51) Int. Cl.
*C08F 2/50* (2006.01)
*C08J 3/28* (2006.01)
*G02B 6/00* (2006.01)

(52) U.S. Cl. ........ 522/144; 522/103; 522/100; 522/135; 522/134; 522/142; 522/168; 522/178; 522/181; 385/129; 385/141; 385/143; 385/144; 385/145; 156/272.2

(58) Field of Classification Search .................. 385/129, 385/141; 522/101, 103, 100, 134, 135, 142, 522/144, 168, 170, 178, 181, 182; 156/272.2
See application file for complete search history.

(56) References Cited

U.S. PATENT DOCUMENTS 7,751,678 B2 * 7/2010 Shibata et al. ................ 385/141

FOREIGN PATENT DOCUMENTS

| | | |
|---|---|---|
| JP | 04-122714 | 4/1992 |
| JP | 04120124 A * | 4/1992 |
| JP | 06-258537 | 9/1994 |
| JP | 2000-047383 | 2/2000 |
| JP | 2000-147765 | 5/2000 |
| JP | 2003-149476 | 5/2003 |
| JP | 2003-195079 | 7/2003 |
| JP | 2004-256717 | 9/2004 |
| JP | 2006-036801 | 2/2006 |
| JP | 2006-176658 | 6/2006 |
| WO | WO 2006/038691 A1 | 4/2006 |

OTHER PUBLICATIONS

Epikote Resins for Coating, Civil Engineering and Adhesive Applications. Hexion Specialty Chemicals Product Bulletin. [online]. [Retived online on Mar. 12, 2011]. Retrieved from internet <URL:http://itecwrap.com/PDF_BASE_1/EPIKOTE_Resins_for_Coatings,_Civil_Engineering_and_Adhesive_Applications(2).pdf>.*

Epoxy Resins for Epoxy Division of Mitsubishi Product bulletin. [online]. [retrieved online on Dec. 3, 2011]. Retrieved from the internet <URL:http://translate.google.com/translate?hl=en&sl=ja&u=http://www.mcc-epoxy.jp/products/epoxy_jer.html&ei=LSndTpm0Mlb20gGrnbDbDQ&sa=X&oi=translate&ct=result&resnum=10&ved=0CFUQ7gEwCTgK&prev=/search%3Fq%3Depikote.*

* cited by examiner

*Primary Examiner* — Sanza McClendon
(74) *Attorney, Agent, or Firm* — Antonelli, Terry, Stout & Kraus, LLP.

(57) ABSTRACT

The present invention relates to a phenoxy resin for an optical material obtained by subjecting at least one selected from specific difunctional epoxy resins and at least one selected from specific difunctional phenols to polyaddition reaction, wherein a film comprising the above phenoxy resin has a refractive index of 1.580 or less at 25° C. and a wavelength of 830 nm, a resin composition for an optical material containing the above phenoxy resin, a resin film for an optical material comprising the above resin composition and an optical waveguide produced by using the above resin composition and/or the above resin film. The present invention can provide a phenoxy resin for an optical material which is excellent in a heat resistance and a transparency and which has a low refractive index, a resin composition for an optical material containing the above phenoxy resin, a resin film for an optical material comprising the above resin composition and an optical waveguide produced by using the above resin composition and/or the above resin film.

23 Claims, 1 Drawing Sheet

PHENOXY RESIN FOR OPTICAL MATERIAL, RESIN COMPOSITION FOR OPTICAL MATERIAL, RESIN FILM FOR OPTICAL MATERIAL AND OPTICAL WAVEGUIDE USING THOSE

TECHNICAL FIELD

The present invention relates to a phenoxy resin for an optical material which is excellent in a heat resistance and a transparency and which has a low refractive index, a resin composition for an optical material containing the above phenoxy resin, a resin film for an optical material comprising the above resin composition and an optical waveguide prepared by using the resin composition for an optical material and/or the resin film for an optical material.

BACKGROUND ART

In recent years, in high speed and high density signal transmission between electronic devices and between printed wiring boards, transmission through conventional electric wirings is restricted in a rise in a speed and a density due to barriers brought about by mutual interference and attenuation of signals. In order to break through such restrictions, investigated is a technology of connecting electronic devices and printed wiring boards with each other by means of light, so-called optical interconnection. Polymer optical waveguides attract attentions as a transmission path of light from the viewpoints of easy processing, a low cost, a high freedom in wiring and a possible rise in a density.

A type in which the polymer optical waveguide is prepared on a glass epoxy resin substrate assuming that it is applied to optical and electrical mixed boards and a flexible type which does not have a hard support substrate assuming connection between boards are considered to be suitable as the form of the polymer optical waveguide.

A high heat resistance in addition to a high transparency (low optical transmission loss) is required to a polymer optical waveguide from the viewpoints of use environment of appliances to which it is applied and mounting of parts. (Meth)acryl polymers are known as a material for the above optical waveguide material, and optical waveguides prepared by using the above polymer are proposed (refer to, for example, patent documents 1 and 2).

However, a transparency and a heat resistance of the optical waveguides described in the patent document 1 are not specifically described and therefore are not clearly specified. Further, the optical waveguide described in the patent document 2 has a high transparency of an optical transmission loss of 0.3 dB/cm in a wavelength of 850 nm, but specific test results of an optical transmission loss, for example, after a solder reflow test are not described, and the heat resistance is not clearly specified.

On the other hand, a phenoxy resin is known as an optical waveguide material having a high heat resistance (refer to, for example, a patent document 3).

In general, a phenoxy resin is produced by one-stage method in which bisphenol A and epichlorohydrin are subjected to polycondensation reaction and by two-stage method in which an epoxy resin having a low molecular weight and bisphenol A are subjected to polyaddition reaction. It contains a lot of aromatic rings in the resin and therefore has a high heat resistance, and on the other hand, it has a high refractive index. It is indispensable to control a refractive index in designing optical parts, and when conventional phenoxy resins are used, involved therein is the problem that they have a high refractive index and therefore can not generally be used for low refractive index optical parts.

Further, a resin composition containing a carboxylic acid-modified phenoxy resin is known as a light-sensitive resin composition which is excellent in a heat resistance and which can be developed by an alkali aqueous solution (refer to, for example, patent documents 4 and 5).

However, the above resin compositions have been invented for plating resists in a production process for printed wiring boards, and they are excellent in a heat resistance but low in a transparency and are not suitable as a resin composition for an optical material.

Patent document 1: JP 6-258537 A
Patent document 2: JP 2003-195079 A
Patent document 3: JP 4-122714 A
Patent document 4: JP 2000-47383 A
Patent document 5: JP 2000-147765 A

DISCLOSURE OF THE INVENTION

The present invention has been made in light of the viewpoints described above, and an object of the present invention is to provide a phenoxy resin for an optical material which is excellent in a heat resistance and a transparency and which has a low refractive index, a resin composition for an optical material containing the above phenoxy resin, a resin film for an optical material comprising the above resin composition and an optical waveguide prepared by using the resin composition for an optical material and/or the resin film for an optical material.

Intensive investigations repeated by the present inventors have resulted in finding that the problems described above can be solved by using a phenoxy resin for an optical material described below, a resin composition for an optical material containing the above resin, a resin film for an optical material comprising the above resin composition and an optical waveguide produced by using them.

That is, the present invention relates to the following items:

(1) A phenoxy resin for an optical material obtained by subjecting at least one selected from difunctional epoxy resins represented by the following Formulas (1) to (5) and at least one selected from difunctional phenols represented by the following Formulas (6) to (9) to polyaddition reaction, wherein a film comprising the above phenoxy resin has a refractive index of 1.580 or less at 25° C. and a wavelength of 830 nm:

[Formula 1]

(1)

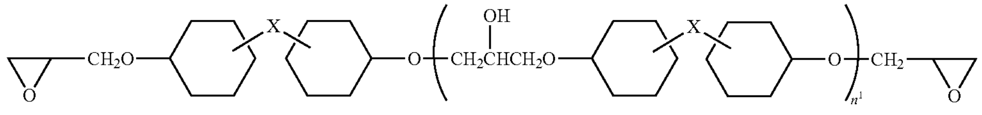

X = $CH_2$, $C(CH_3)_2$, 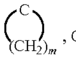, $CF_2$, $C(CF_3)_2$,O, S, $SO_2$ (wherein $n^1$ represents an integer of 0 to 5, and m represents an integer of 2 to 10);

[Formula 2]

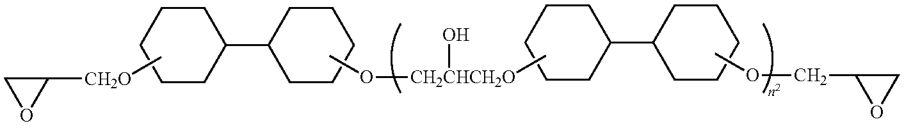

(2)

(wherein $n^2$ represents an integer of 0 to 5);

[Formula 3]

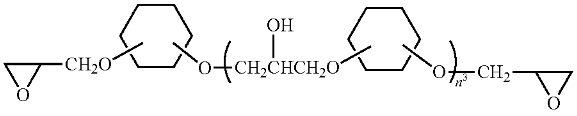

(3)

(wherein $n^3$ represents an integer of 0 to 5);

[Formula 4]

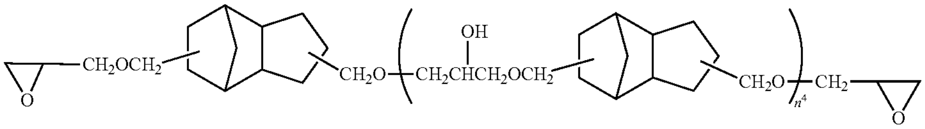

(4)

(wherein $n^4$ represents an integer of 0 to 5);

[Formula 5]

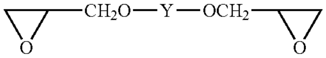

(5)

Y = $(CH_2)_p$, $CH_2(CF_2)_pCH_2$, $CH_2C(CH_3)_2CH_2$, $CH_2CH(OH)CH_2$, $(CH_2CH_2O)_q$, $[CH_2CH(CH_3)O]_q$ (wherein p represents an integer of 2 to 10, and q represents an integer of 1 to 5);

[Formula 6]

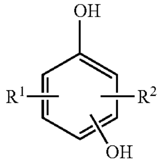

(6)

(wherein $R^1$ and $R^2$ each represent independently any of a hydrogen atom, a fluorine atom, an organic group having 1 to 12 carbon atoms and a fluorine-containing organic group having 1 to 12 carbon atoms);

[Formula 7]

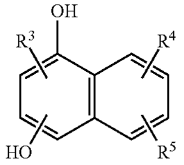

(7)

(wherein $R^3$, $R^4$ and $R^5$ each represent independently any of a hydrogen atom, a fluorine atom, an organic group having 1 to 12 carbon atoms and a fluorine-containing organic group having 1 to 12 carbon atoms);

[Formula 8]

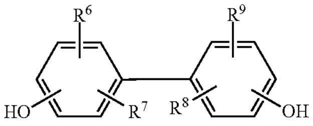

(8)

(wherein $R^6$, $R^7$, $R^8$ and $R^9$ each represent independently any of a hydrogen atom, a fluorine atom, an organic group having 1 to 12 carbon atoms and a fluorine-containing organic group having 1 to 12 carbon atoms);

[Formula 9]

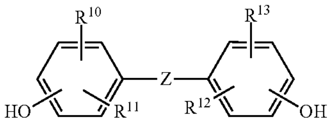

(9)

Z = $CH_2$, $C(CH_3)_2$, 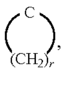, 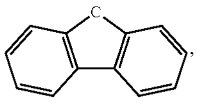, $CF_2$, $C(CF_3)_2$, O, S, $SO_2$ (wherein $R^{10}$, $R^{11}$, $R^{12}$ and $R^{13}$ each represent independently any of a hydrogen atom, a fluorine atom, an organic group having 1 to 12 carbon atoms and a fluorine-containing organic group having 1 to 12 carbon atoms, and r represents an integer of 2 to 10).

(2) The phenoxy resin for an optical material as described in the above item (1), wherein the difunctional epoxy resin is at least one of a hydrogenated bisphenol A type epoxy resin and a hydrogenated bisphenol F type epoxy resin.

(3) The phenoxy resin for an optical material as described in the above item (1) or (2), wherein the difunctional phenol is difunctional fluorine-containing phenol.

(4) The phenoxy resin for an optical material as described in any of the above items (1) to (3), wherein a polymerization mole ratio of the difunctional epoxy resin to the difunctional phenol is 1.0:0.8 to 1.2.

(5) A phenoxy resin for an optical material containing a carboxyl group in a molecule thereof, wherein it is obtained by reacting the phenoxy resin for an optical material as described in any of the above items (1) to (4) with polybasic acid anhydride.

(6) The phenoxy resin for an optical material as described in any of the above items (1) to (5), wherein it has a weight average molecular weight is 1,000.

(7) The phenoxy resin for an optical material as described in any of the above items (1) to (6), wherein it has a viscosity of 100 to 30,000 mPa·s at 25° C. in a N,N-dimethylacetamide solution having a solid matter concentration of 40 mass %.

(8) The phenoxy resin for an optical material as described in any of the above items (1) to (7), wherein it has a glass transition temperature of 30 to 400° C.

(9) The phenoxy resin for an optical material as described in any of the above items (1) to (8), wherein it has a 5% weight loss temperature of 150 to 600° C. in the air.

(10) A resin composition for an optical material comprising (A) the phenoxy resin for an optical material as described in any of the above items (1) to (9), (B) a polymerizable compound and (C) a polymerization initiator.

(11) The resin composition for an optical material as described in the above item (10), wherein a blending amount of the component (A) is 10 to 85 mass % based on the total amount of the component (A) and the component (B); a blending amount of the component (B) is 15 to 90 mass % based on the total amount of the component (A) and the component (B); and a blending amount of the component (C) is 0.1 to 10 mass % based on the total amount of the component (A) and the component (B).

(12) The resin composition for an optical material as described in the above item (10) or (11), wherein the polymerizable compound (B) is a compound containing at least one of an ethylenically unsaturated group and two or more epoxy groups in a molecule thereof.

(13) The resin composition for an optical material as described in any of the above items (10) to (12), wherein the polymerizable compound (B) is a compound containing at least one selected from the group consisting of an alicyclic structure, an aryl group, an aryloxy group and an aralkyl group in a molecule thereof.

(14) The resin composition for an optical material as described in any of the above items (10) to (13), wherein the polymerization initiator (C) is a photoradical polymerization initiator and/or a photocationic polymerization initiator.

(15) The resin composition for an optical material as described in any of the above items (10) to (14), wherein a cured film prepared by polymerizing and curing the resin composition for an optical material described above has a refractive index of 1.300 to 1.600 at 25° C. and a wavelength of 830 nm.

(16) The resin composition for an optical material as described in any of the above items (10) to (15), wherein a cured film having a thickness of 50 μm prepared by polymerizing and curing the resin composition for an optical material described above has a transmission factor of 80% or more at 25° C. and a wavelength of 400 nm.

(17) A resin film for an optical material comprising the resin composition for an optical material as described in any of the above items (10) to (16).

(18) An optical waveguide having a core part and/or a cladding layer formed by using the resin composition for an optical material as described in any of the above items (10) to (16).

(19) An optical waveguide having a core part and/or a cladding layer formed by using the resin film for an optical material as described in the above item (17).

(20) The optical waveguide as described in the above item (18) or (19), wherein it has an optical transmission loss of 0.3 dB/cm or less.

(21) The optical waveguide as described in any of the above items (18) to (20), wherein it has an optical transmission loss of 0.3 dB/cm or less after carrying out three times a reflow test at a maximum temperature of 265° C.

According to the present invention, capable of being provided are a phenoxy resin for an optical material which is excellent in a heat resistance and a transparency and which has a low refractive index, a resin composition for an optical material containing the above phenoxy resin, a resin film for an optical material comprising the above resin composition and an optical waveguide prepared by using the resin composition for an optical material and/or the resin film for an optical material.

EXPLANATION OF REFERENCE NUMERALS

Figure 1:
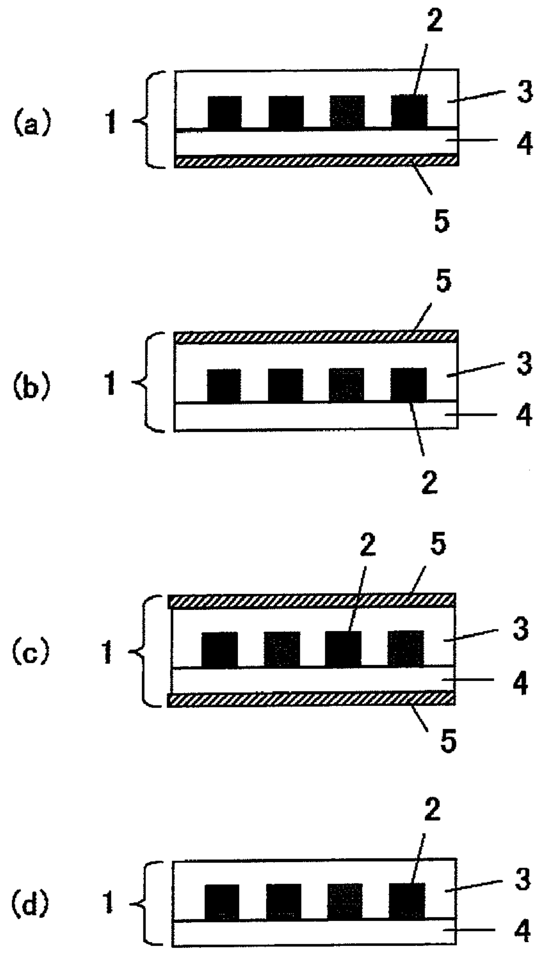
FIG. 1 is a cross-sectional drawing for explaining the form of the optical waveguide of the present invention.

1 Optical waveguide
2 Core part
3 Upper cladding layer
4 Lower cladding layer
5 Substrate or cover film

BEST MODE FOR CARRYING OUT THE INVENTION

The phenoxy resin for an optical material according to the present invention shall be explained below.

The phenoxy resin for an optical material according to the present invention is obtained by a method in which a difunctional epoxy resin and difunctional phenol are used as raw materials and subjected to polyaddition reaction. The above method is called usually a two-stage method, and to be specific, it includes suitably a method in which the difunctional compounds of the raw materials described above are polymerized alternately in a synthetic reaction solvent in the presence of a suited catalyst. In general, a phenoxy resin is obtained as well by one-stage method in which epichlorohydrin and difunctional phenol are subjected to polycondensation reaction, and when the one-stage method is used, a step for removing sodium chloride and the like which are by-produced by the reaction is required.

The difunctional epoxy resin used in the present invention shall not specifically be restricted as long as it is an alicyclic or aliphatic compound represented by any of the following Formulas (1) to (5) which has two epoxy groups in a molecule thereof.

It includes, for example, hydrogenated difunctional phenol glycidyl ethers such as hydrogenated bisphenol A type epoxy resins, hydrogenated bisphenol F type epoxy resins, hydrogenated bisphenol AF type epoxy resins, hydrogenated bisphenol AD type epoxy resins and the like which are represented by the following Formula (1); hydrogenated biphenol glycidyl ethers such as hydrogenated 2,2'-biphenol type epoxy resins, hydrogenated 4,4'-biphenol type epoxy resins and the like which are represented by the following Formula (2); difunctional alicyclic alcohol glycidyl ethers such as cyclohexanediol type epoxy resins represented by the following Formula (3) and tricyclodecanedimethanol type epoxy resins represented by the following Formula (4); difunctional aliphatic alcohol glycidyl ethers such as polyethylene glycol type epoxy resins, polypropylene glycol type epoxy resins, neopentyl glycol type epoxy resins, hexanediol type epoxy resins, perfluoroalkyldiol type epoxy resins and the like which are represented by the following Formula (5).

Among them, the hydrogenated bisphenol A type epoxy resins and the hydrogenated bisphenol F type epoxy resins are preferred from the viewpoints of a transparency and a weatherability.

The difunctional epoxy resins described above shall not specifically be restricted in a molecular weight, and they may be used alone or in combination of two or more kinds thereof.

[Formula 10]

(1)

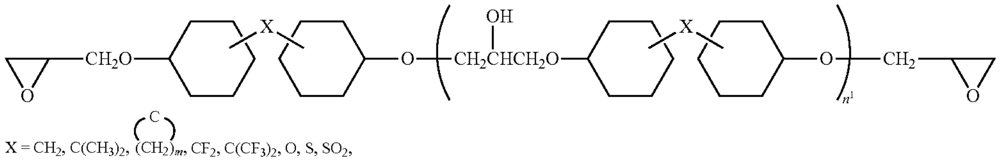

(wherein $n^1$ represents an integer of 0 to 5, and m represents an integer of 2 to 10);

[Formula 11]

(2)

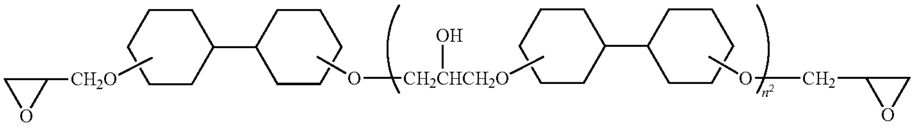

(wherein $n^2$ represents an integer of 0 to 5);

[Formula 12]

(3)

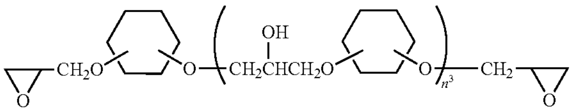

(wherein $n^3$ represents an integer of 0 to 5);

[Formula 13]

(4)

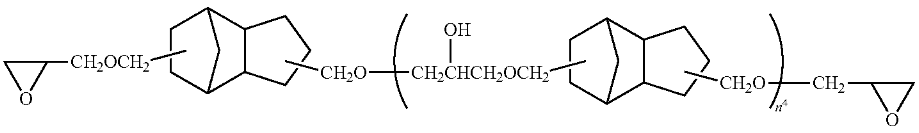

(wherein $n^4$ represents an integer of 0 to 5);

[Formula 14]

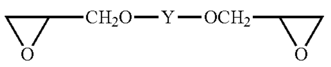

(5)

Y = $(CH_2)_p$, $CH_2(CF_2)_pCH_2$, $CH_2C(CH_3)_2CH_2$, $CH_2CH(OH)CH_2$, $(CH_2CH_2O)_q$, $[CH_2CH(CH_3)O]_q$ (wherein p represents an integer of 2 to 10, and q represents an integer of 1 to 5).

The difunctional phenol used in the present invention shall not specifically be restricted as long as it is a compound represented by any of the following Formulas (6) to (9) which has two phenolic hydroxyl groups. It includes, for example, mononuclear difunctional phenols such as hydroquinone, resorcinol and catechol each represented by the following Formula (6) and 1,4-naphthalenediol, 1,5-naphthalenediol, 1,6-naphthalenediol and 1,7-naphthalenediol each represented by the following Formula (7), organic group-substituted compounds or fluorinated compounds thereof; polynuclear difunctional phenols such as bisphenols such as 2,2'-biphenol and 4,4'-biphenol each represented by the following Formula (8), organic group-substituted compounds or fluorinated compounds thereof and bisphenol A, bisphenol F and bisphenol S each represented by the following Formula (9), organic group-substituted compounds or fluorinated compounds thereof such as bisphenol AF.

Among them, fluorine-containing difunctional phenols are preferred from the viewpoint of a low refractive index.

To be specific, the fluorine-containing difunctional phenols may be compounds obtained by introducing a fluorine atom into any position of the compounds represented by the following Formulas (6) to (9). They suitably include, for example, bisphenol AF described above and difunctional phenols containing as a substituent in a phenol ring, a fluorine atom or a fluorine-containing organic group obtained by substituting at least one hydrogen atom of an alkyl group such as methyl, ethyl, propyl, isopropyl and the like with a fluorine atom.

The difunctional phenols described above can be used alone or in combination of two or more kinds thereof.

[Formula 15]

(6)

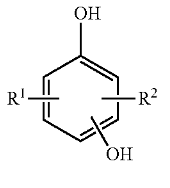

(wherein $R^1$ and $R^2$ each represent independently any of a hydrogen atom, a fluorine atom, an organic group having 1 to 12 carbon atoms and a fluorine-containing organic group having 1 to 12 carbon atoms);

[Formula 16]

(7)

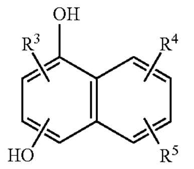

(wherein $R^3$, $R^4$ and $R^5$ each represent independently any of a hydrogen atom, a fluorine atom, an organic group having 1 to 12 carbon atoms and a fluorine-containing organic group having 1 to 12 carbon atoms);

[Formula 17]

(8)

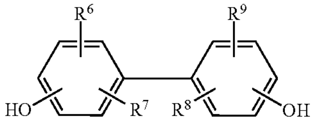

(wherein $R^6$, $R^7$, $R^8$ and $R^9$ each represent independently any of a hydrogen atom, a fluorine atom, an organic group having 1 to 12 carbon atoms and a fluorine-containing organic group having 1 to 12 carbon atoms);

[Formula 18]

(9)

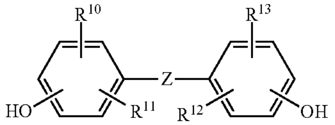

Z= $CH_2$, $C(CH_3)_2$, 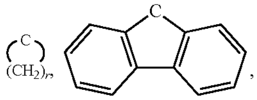, $CF_2$, $C(CF_3)_2$, O, S, $SO_2$ (wherein $R^{10}$, $R^{11}$, $R^{12}$ and $R^{13}$ each represent independently any of a hydrogen atom, a fluorine atom, an organic group having 1 to 12 carbon atoms and a fluorine-containing organic group having 1 to 12 carbon atoms, and r represents an integer of 2 to 10).

A catalyst used in synthesizing the phenoxy resin for an optical material according to the present invention shall not specifically be restricted as long as it accelerates etherification reaction of an epoxy group with a phenolic hydroxyl group. It includes, for example, alkali metal hydroxides such as lithium hydroxide, sodium hydroxide, potassium hydroxide and the like; alkali metal carbonates such as lithium carbonate, sodium carbonate, potassium carbonate and the like; alkali metal alkoxides such as lithium methoxide, lithium ethoxide, lithium t-butoxide, sodium methoxide, sodium ethoxide, sodium t-butoxide, potassium methoxide, potassium ethoxide, potassium t-butoxide and the like; alkali metal phenoxides such as lithium phenoxide, sodium phenoxide, potassium phenoxide and the like; alkali metal hydrides such as lithium hydride, sodium hydride, potassium hydride and the like; alkali metal boron hydrides such lithium boron hydride, sodium boron hydride, potassium boron hydride and the like; alkali metal amides such as lithium amide, sodium amide and the like; organic phosphorus compounds such as hexamethylphosphoric triamide, tri(dichloropropyl) phosphate, tri(chloropropyl) phosphate, trimethyl phosphate, tri-n-butylphosphine, triisopropylphosphine, tricyclohexylphosphine, triphenyl phosphite, phenylphosphonic acid, triphenylphosphine, diphenylphosphine and the like; secondary amines such as benzylmethylamine, methylaniline and the like; tertiary amines such as triethylamine, tri-n-propylamine, triisopropylamine, tri-n-butylamine, dimethylisopropylamine, benzyldimethylamine, N,N-dimethylaniline, N,N,N',N'-tetramethylethylenediamine and the like; cyclic amines such as pyrrolidine, N-methylpyrrolidine, piperidine, N-methylpiperidine, morpholine, N-methylmorpholine, piperazine, N,N'-dimethylpiperazine, 1,4-diazabicyclo[2.2.2]octane, 1,5-diazabicyclo[4.3.0]nona-5-ene, 1,8-diazabicyclo[5.4.0]undeca-7-ene and the like; imidazoles such as imidazole, 1-methylimidazole, 2-methylimidazole, 4-methylimidazole, 1-ethylimidazole, 2-ethylimidazole, 4-ethylimidazole, 1-isopropylimidazole, 2-isopropylimidazole, 4-isopropylimidazole, 2-undecylimidazole, 2-heptadecylimidazole, 1-phenylimidazole, 2-phenylimidazole, 4-phenylimidazole, 2,4-dimethylimidazole, 2,4-diethylimidazole, 2,4-diisopropylimidazole, 2,4-diphenylimidazole, 2-ethyl-4-methylimidazole, 1-benzyl-2-methylimidazole, 1-cyanoethyl-2-methylimidazole, benzimidazole, 2-methylimidazoline, 2-undecylimidazoline, 2-heptadecylimidazoline and the like; quaternary ammonium salts such as tetra-n-butylammonium chloride, tetra-n-butylammonium bromide, tetra-n-butylammonium iodide, benzyltrimethylammonium chloride, benzyltrimethylammonium bromide, benzyltrimethylammonium iodide and the like.

The above compounds can be used alone or in combination of two or more kinds thereof.

A blending amount of the catalysts described above is preferably 0.001 to 0.20 mole per mole of the difunctional epoxy resin. If it is 0.001 mole or more, the preferred reaction speed is obtained, and the polyaddition reaction proceeds. If it is 0.20 mole or less, the resin can be provided with a higher molecular weight in a linear form without bringing about cross-linking reaction as side reaction. From the viewpoint described above, the blending amount is more preferably 0.005 to 0.15 mole, particularly preferably 0.01 to 0.10 mole.

A reaction solvent used in synthesizing the phenoxy resin for an optical material according to the present invention shall not specifically be restricted as long as it is a solvent which dissolves the difunctional epoxy resin and the difunctional phenol and which dissolves as well the phenoxy resin synthesized. Amide base solvents, ketone base solvents and ether base solvents each having a boiling point of 80 to 300° C. are preferably used. If the boiling point is 80° C. or higher, the synthesizing temperature can be elevated. If it is 300° C. or lower, the solvent can readily be removed when the synthesized phenoxy resin is isolated. From the viewpoints described above, the boiling point is more preferably 100 to 300° C., particularly preferably 130 to 250° C.

The amide base solvents having a boiling point of 80 to 300° C. include, for example, formamide, N-methylformamide, N,N-dimethylformamide, acetamide, N-methylacetamide, N,N-dimethylacetamide, 2-pyrrolidone, N-methylpyrrolidone and the like.

The ketone base solvents having a boiling point of 80 to 300° C. include, for example, methyl ethyl ketone, methyl isobutyl ketone, 3-pentanone, diisobutyl ketone, cyclopentanone, cyclohexanone, methylcyclohexanone, acetophenone, acetylacetone and the like.

The ether base solvents having a boiling point of 80 to 300° C. include, for example, ethylene glycol dimethyl ether, ethylene glycol monoethyl ether, ethylene glycol monobutyl ether, propylene glycol monomethyl ether, propylene glycol monomethyl ether acetate, diethylene glycol monomethyl ether, diethylene glycol dimethyl ether and the like.

The reaction solvents described above can be used alone or in combination of two or more kinds thereof.

In addition to the reaction solvents described above, aromatic hydrocarbons such as toluene, xylene, mesitylene, cumene, p-cymene and the like can be used in combination with the reaction solvents described above.

A solid matter concentration of the reaction solution used in synthesizing the phenoxy resin for an optical material according to the present invention is preferably 5 to 70 mass %. If it is 5 mass % or more, the preferred reaction rate is obtained. If it is 70 mass % or less, the phenoxy resin can be obtained without bringing about cross-linking reaction as side reaction. From the viewpoints described above, the solid matter concentration is more preferably 10 to 60 mass %, particularly preferably 20 to 50 mass %.

A reaction temperature in synthesizing the phenoxy resin for an optical material according to the present invention is preferably 40 to 180° C. If it is 40° C. or higher, the preferred reaction rate is obtained. If it is 180° C. or lower, the resin can be provided with a higher molecular weight in a linear form without bringing about cross-linking reaction as side reaction. From the viewpoint described above, the reaction temperature is more preferably 60 to 160° C., particularly preferably 80 to 140° C.

In the present invention, a polymerization mole ratio of the difunctional epoxy resin to the difunctional phenol in synthesizing the phenoxy resin for an optical material according to the present invention is preferably 1.0:0.8 to 1.2. If a polymerization mole ratio of t the difunctional phenol is 0.8 or more, the resin can be provided with a higher molecular weight in a linear form without bringing about cross-linking reaction as side reaction, and a solubility of the resin to the solvent can be obtained. On the other hand, if it is 1.2 or less, an increase in a molecular weight of the resin is readily advanced. From the viewpoint described above, a polymerization mole ratio of the difunctional epoxy resin to the difunctional phenol is more preferably 1.0:0.85 to 1.15, particularly preferably 1.0:0.9 to 1.1.

The phenoxy resin for an optical material according to the present invention may be a phenoxy resin for an optical material containing a carboxyl group in a molecule thereof which is obtained by subjecting polybasic acid anhydride to addition reaction with the above phenoxy resin.

The polybasic acid anhydride includes succinic anhydride, glutaric anhydride, itaconic anhydride, maleic anhydride, citraconic anhydride, phthalic anhydride, tetrahydrophthalic anhydride, hexahydrophthalic anhydride, trimellitic anhydride, hexahydrotrimellitic anhydride and the like.

Among them, succinic anhydride, glutaric anhydride, tetrahydrophthalic anhydride, hexahydrophthalic anhydride and hexahydrotrimellitic anhydride are preferred from the viewpoints of a transparency, a heat resistance, a low refractive index and a solubility.

Further, the phenoxy resin for an optical material according to the present invention may contain, if necessary, an ethylenically unsaturated group at a side chain thereof. A composition and a synthetic method thereof shall not specifically be restricted, and a compound having at least one ethylenically unsaturated group and one functional group such as an epoxy group, an oxetanyl group, an isocyanate group, a hydroxy group and a carboxyl group can be subjected to addition reaction or condensation reaction with the phenoxy resin for an optical material described above to introduce the ethylenically unsaturated group into a side chain thereof.

The above compounds shall not specifically be restricted and include compounds having an ethylenically unsaturated group and an epoxy group, such as glycidyl (meth)acrylate, α-ethylglycidyl (meth)acrylate, α-n-propylglycidyl (meth) acrylate, α-n-butylglycidyl (meth)acrylate, 2-methylglycidyl (meth)acrylate, 2-ethylglycidyl (meth)acrylate, 2-propylglycidyl (meth)acrylate, 3,4-epoxybutyl (meth)acrylate, 3,4-epoxyheptyl (meth)acrylate, α-ethyl-6,7-epoxyheptyl (meth) acrylate, 3,4-epoxycyclohexylmethyl (meth)acrylate, o-vinylbenzylglycidyl ether, m-vinylbenzylglycidyl ether, p-vinylbenzylglycidyl ether and the like; compounds having an ethylenically unsaturated group and an oxetanyl group, such as (2-ethyl-2-oxetanyl)methyl (meth)acrylate, (2-methyl-2-oxetanyl)methyl (meth)acrylate, 2-(2-ethyl-2-oxetanyl)ethyl (meth)acrylate, 2-(2-methyl-2-oxetanyl)ethyl (meth)acrylate, 3-(2-ethyl-2-oxetanyl)propyl (meth)acrylate, 3-(2-methyl-2-oxetanyl)propyl (meth)acrylate and the like; compounds having an ethylenically unsaturated group and an isocyanate group, such as ethyl isocyanate (meth)acrylate and the like; compounds having an ethylenically unsaturated group and a hydroxy group, such as 2-hydroxyethyl (meth) acrylate, 2-hydroxypropyl (meth)acrylate, 3-chloro-2-hydroxypropyl (meth)acrylate, 2-hydroxybutyl (meth)acrylate and the like; compounds having an ethylenically unsaturated group and a carboxy group, such as (meth)acrylic acid, crotonic acid, cinnamic acid, (2-(meth)acryloyloxyethyl) succinate, 2-phthaloylethyl (meth)acrylate, 2-tetrahydrophthaloylethyl (meth)acrylate, 2-hexahydrophthaloylethyl (meth) acrylate, ω-carboxy-polycaprolactone mono(meth)acrylate, 3-vinylbenzoic acid, 4-vinylbenzoic acid and the like.

In this connection, (meth)acrylate means acrylate and/or methacrylate.

In the phenoxy resin for an optical material according to the present invention, a resin film comprising the above phenoxy resin has to have a refractive index of 1.580 or less at 25° C. and a wavelength of 830 nm. If it is 1.580 or less, the phenoxy resin can readily be used for optical parts requiring a low refractive index. From the viewpoint described above, the refractive index is preferably 1.560 or less, particularly preferably 1.540 or less.

A lower limit of the above refractive index shall not specifically be restricted, and from the viewpoint that a general versatility thereof as an optical material is not damaged, it is preferably 1.300 or more, more preferably 1.350 or more, further preferably 1.400 or more and particularly preferably 1.450 or more.

An average molecular weight of the phenoxy resin for an optical material according to the present invention falls preferably in a range of 1,000 to 2,000,000 in terms of a weight average molecular weight. If it is 1,000 or more, the resin composition prepared therefrom has a satisfactory strength because of a large molecular weight, and if it is 2,000,000 or less, a solubility thereof in an organic solvent and a compatibility thereof with the polymerizable compound (B) described later in details are improved. From the viewpoints described above, the average molecular weight falls in a range of more preferably 10,000 to 2,000,000, further preferably 30,000 to 1,500,000 and particularly preferably 50,000 to 1,000,000.

In the case of the phenoxy resin for an optical material having a carboxyl group in a molecule thereof, a weight average molecular weight thereof is preferably 1,000 to 3,000,000. If it is 1,000 or more, the resin composition prepared therefrom has a satisfactory strength because of a large molecular weight, and if it is 3,000,000 or less, a solubility thereof in a developer comprising an alkaline aqueous solution and a compatibility thereof with the polymerizable compound (B) are improved. From the viewpoints described above, the average molecular weight is more preferably 1,000 to 2,000,000, further preferably 3,000 to 2,000,000 and particularly preferably 5,000 to 1,000,000.

The average molecular weight in the present invention is a value measured by gel permeation chromatography (GPC) and reduced to standard polystyrene.

In the case of the phenoxy resin for an optical material having a carboxyl group in a molecule thereof, an acid value thereof can be regulated so that it can be developed by publicly known various developers in a step in which a layer of a light-sensitive resin composition is selectively removed by a developer described later to form a pattern. When it is developed by using an alkaline aqueous solution of, for example, sodium carbonate, potassium carbonate, tetramethylammonium hydroxide, triethanolamine and the like, the acid value is preferably 20 to 300 mg KOH/g. If it is 20 mg KOH/g or more, development is facilitated, and if it is 300 mg KOH/g or less, the developer resistance is not reduced. From the viewpoints described above, the acid value is more preferably 30 to 250 mg KOH/g and particularly preferably 40 to 200 mg KOH/g.

When an alkaline aqueous solution comprising water or an alkaline aqueous solution and at least one organic solvent is used to carry out development, the acid value is preferably 10 to 250 mg KOH/g. If the acid value is 10 mg KOH/g or more, development is facilitated, and if it is 250 mg KOH/g or less, the developer resistance is not reduced. From the viewpoints described above, the acid value is more preferably 20 to 200 mg KOH/g and particularly preferably 30 to 150 mg KOH/g.

An N,N-dimethylacetamide solution (solid matter concentration: 40 mass %) of the phenoxy resin for an optical material according to the present invention has preferably a viscosity of 100 to 30,000 mPa·s at 25° C. If it is 100 mPa·s or more, the film having a desired film thickness can be formed, and if it is 30,000 mPa·s or less, handling thereof is facilitated. From the viewpoints described above, the viscosity is more preferably 500 to 30,000 mPa·s and particularly preferably 1,000 to 15,000 mPa·s.

The solution viscosity in the present invention is a value measured by means of an E type viscometer.

The phenoxy resin for an optical material according to the present invention has preferably a glass transition temperature of 30 to 400° C. If it is 30° C. or higher, degradation of the resin brought about at high temperature in a reflow process and the like can be reduced, and if it is 400° C. or lower, the resin is provided with a sufficiently high heat resistance and is not damaged in optical characteristics such as a transparency to a large extent, so that it is suitable. From the viewpoints described above, the glass transition temperature is more preferably 60 to 300° C.

The glass transition temperature in the present invention is a value determined by differential scanning calorimetry (DSC).

The phenoxy resin for an optical material according to the present invention has preferably a 5% weight loss temperature of 150 to 600° C. in the air. If it is 150° C. or higher, decomposition of the resin brought about at high temperature in a reflow process and the like can be reduced. If it is 600° C. or lower, the resin is provided with a sufficiently high heat resistance and is not damaged in optical characteristics such as a transparency to a large extent, and it is suitable. From the viewpoints described above, the 5% weight loss temperature is more preferably 200 to 600° C., further preferably 250 to 550° C. and particularly preferably 300 to 500° C.

The 5% weight loss temperature in the present invention is a value determined by thermogravimetry-differential thermal analysis (TG-DTA).

The resin composition for an optical material according to the present invention shall be explained below.

The resin composition for an optical material according to the present invention shall not specifically be restricted as long as it is a resin composition containing the phenoxy resin for an optical material described above, and it is preferably a resin composition which is cured by heat or irradiation with an actinic ray. To be specific, it is preferably a resin composition comprising (A) the phenoxy resin for an optical material described above, (B) a polymerizable compound and (C) a polymerization initiator.

A blending amount of the component (A) is preferably 10 to 85 mass % based on the total amount of the component (A) and the component (B). If it is 10 mass % or more, the cured matter having a sufficiently high strength and a sufficiently large flexibility is obtained. If it is 85 mass % or less, the component (A) is readily entangled by the component (B) and cured in exposure, and the sufficiently high solvent resistance is obtained. From the viewpoints described above, the blending amount is more preferably 10 to 80 mass %, particularly preferably 20 to 70 mass %.

The polymerizable compound (B) of the present invention shall be explained below.

The polymerizable compound (B) shall not specifically be restricted as long as it is cured by heat or irradiation with an actinic ray, and it includes, for example, compounds having an ethylenically unsaturated group in a molecule.

To be specific, it includes (meth)acrylates, vinylidene halides, vinyl ethers, vinyl esters, vinylpyridine, vinylamide, aryl vinyl and the like, and among them, (meth)acrylate and aryl vinyl are preferred from the viewpoints of the transparency and the heat resistance. Any of monofunctional compounds, difunctional compounds and tri- or more polyfunctional compounds can be used as the (meth)acrylates.

The monofunctional (meth)acrylate includes, for example, aliphatic (meth)acrylates such as methyl (meth)acrylate, ethyl (meth)acrylate, butyl (meth)acrylate, isobutyl (meth) acrylate, tert-butyl (meth)acrylate, butoxyethyl (meth)acrylate, isoamyl (meth)acrylate, hexyl (meth)acrylate, 2-ethylhexyl (meth)acrylate, heptyl (meth)acrylate, octyl (meth) acrylate, nonyl (meth)acrylate, decyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, stearyl (meth)acrylate, vehenyl (meth)acrylate, 2-hydroxyethyl (meth)acrylate, 2-hydroxypropyl (meth)acrylate, 3-chloro-2-hydroxypropyl (meth) acrylate, 2-hydroxybutyl (meth)acrylate, methoxypolyethylene glycol (meth)acrylate, ethoxypolyethylene glycol (meth) acrylate, methoxypolypropylene glycol (meth)acrylate, ethoxypolypropylene glycol (meth)acrylate, mono(2-(meth) acryloyloxyethyl) succinate and the like; alicyclic (meth) acrylates such as cyclopentyl (meth)acrylate, cyclohexyl (meth)acrylate, 2-tetrahydrofuryl (meth)acrylate, dicyclopentanyl (meth)acrylate, dicyclopentenyl (meth)acrylate, isobornyl (meth)acrylate, mono(2-(meth)acryloyloxyethyl) tetrahydrophthalate, mono(2-(meth)acryloyloxyethyl) hexahydrophthalate and the like; aromatic (meth)acrylates such as benzyl (meth)acrylate, phenyl (meth)acrylate, o-biphenyl (meth)acrylate, 1-naphthyl (meth)acrylate, 2-naphthyl (meth)acrylate, phenoxyethyl (meth)acrylate, p-cumylphenoxyethyl (meth)acrylate, o-phenylphenoxyethyl (meth)acrylate, 1-naphthoxyethyl (meth)acrylate, 2-naphthoxyethyl (meth)acrylate, 2-(meth)acryloxyethyl-N-carbazole, phenoxypolyethylene glycol (meth)acrylate, nonylphenoxypolyethylene glycol(meth)acrylate, phenoxypolypropylene glycol (meth)acrylate, 2-hydroxy-3-phenoxypropyl (meth)acrylate, 2-hydroxy-3-(o-phenylphenoxy)propyl (meth)acrylate, 2-hydroxy-3-(1-naphthoxy)propyl (meth)acrylate, 2-hydroxy-3-(2-naphthoxy)propyl (meth)acrylate, mono(2-(meth) acryloyloxyethyl) phthalate and the like; and caprolactone-modified compounds thereof.

Among them, preferred from the viewpoints of the transparency and the heat resistance are the alicyclic (meth)acrylates described above; and the aromatic (meth)acrylates such as benzyl (meth)acrylate, phenyl (meth)acrylate, o-biphenyl (meth)acrylate, 1-naphthyl (meth)acrylate, 2-naphthyl (meth)acrylate, phenoxyethyl (meth)acrylate, p-cumylphenoxyethyl (meth)acrylate, o-phenylphenoxyethyl (meth) acrylate, 1-naphthoxyethyl (meth)acrylate, 2-naphthoxyethyl (meth)acrylate, 2-(meth)acryloxyethyl-N-carbazole, 2-hydroxy-3-phenoxypropyl (meth)acrylate, 2-hydroxy-3-(o-phenylphenoxy)propyl (meth)acrylate, 2-hydroxy-3-(1-naphthoxy)propyl (meth)acrylate, 2-hydroxy-3-(2-naphthoxy)propyl (meth)acrylate, mono(2-(meth) acryloyloxyethyl) phthalate and the like.

The difunctional (meth)acrylate includes, for example, aliphatic (meth)acrylates such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, ethoxylated polypropylene glycol di(meth)acrylate, 1,3-butanediol di(meth)acrylate, 1,4-butanediol di(meth)acrylate, neopentyl glycol di(meth)acrylate, 3-methyl-1,5-pentanediol di(meth)acrylate, 1,6-hexanediol di(meth)acrylate, 2-butyl-2-ethyl-1,3-propanediol di(meth)acrylate, 1,9-nonanediol di(meth)acrylate, 1,10-decanediol di(meth)acrylate, glycerin di(meth)acrylate, ethoxylated 2-methyl-1,3-propanediol di(meth)acrylate and the like; alicyclic (meth)acrylates such as cyclohexanedimethanol (meth)acrylate, ethoxylated cyclohexanedimethanol (meth)acrylate, propoxylated cyclohexanedimethanol (meth)acrylate, ethoxylated propoxylated cyclohexanedimethanol (meth)acrylate, tricyclodecanedimethanol (meth)acrylate, ethoxylated tricyclodecanedimethanol (meth)acrylate, propoxylated tricyclodecanedimethanol (meth)acrylate, ethoxylated propoxylated tricyclodecanedimethanol (meth)acrylate, ethoxylated hydrogenated bisphenol A di(meth)acrylate, propoxylated hydrogenated bisphenol A di(meth)acrylate, ethoxylated propoxylated hydrogenated bisphenol A di(meth)acrylate, ethoxylated hydrogenated bisphenol F di(meth)acrylate, propoxylated hydrogenated bisphenol F di(meth)acrylate, ethoxylated propoxylated hydrogenated bisphenol F di(meth)acrylate and the like; aromatic (meth)acrylates such as ethoxylated bisphenol A di(meth)acrylate, propoxylated bisphenol A di(meth)acrylate, ethoxylated propoxylated bisphenol A di(meth)acrylate, ethoxylated bisphenol F di(meth)acrylate, propoxylated bisphenol F di(meth)acrylate, ethoxylated propoxylated bisphenol F di(meth)acrylate, ethoxylated bisphenol AF di(meth)acrylate, propoxylated bisphenol AF di(meth)acrylate, ethoxylated propoxylated bisphenol AF di(meth)acrylate, ethoxylated fluorene type di(meth)acrylate, propoxylated fluorene type di(meth)acrylate, ethoxylated propoxylated fluorene type di(meth)acrylate and the like; caprolactone-modified compounds thereof; aliphatic epoxy (meth)acrylates such as neopentyl glycol type epoxy (meth)acrylate and the like; alicyclic epoxy (meth) acrylates such as cyclohexanedimethanol type epoxy (meth)

acrylate, hydrogenated bisphenol A type epoxy (meth)acrylate, hydrogenated bisphenol F type epoxy (meth)acrylate and the like and aromatic epoxy (meth)acrylates such as resorcinol type epoxy (meth)acrylate, bisphenol A type epoxy (meth)acrylate, bisphenol F type epoxy (meth)acrylate, bisphenol AF type epoxy (meth)acrylate, fluorene type epoxy (meth)acrylate and the like.

Among them, the alicyclic (meth)acrylates, the aromatic (meth)acrylates, the alicyclic epoxy (meth)acrylates and the aromatic epoxy (meth)acrylates each described above are preferred from the viewpoints of the transparency and the heat resistance.

The tri- or more polyfunctional compounds includes, for example, aliphatic (meth)acrylates such as trimethylolpropane tri(meth)acrylate, ethoxylated trimethylolpropane tri (meth)acrylate, propoxylated trimethylolpropane tri(meth) acrylate, ethoxylated propoxylated trimethylolpropane tri (meth)acrylate, pentaerythritol tri(meth)acrylate, ethoxylated pentaerythritol tri(meth)acrylate, propoxylated pentaerythritol tri(meth)acrylate, ethoxylated propoxylated pentaerythritol tri(meth)acrylate, pentaerythritol tetra(meth) acrylate, ethoxylated pentaerythritol tetra(meth)acrylate, propoxylated pentaerythritol tetra(meth)acrylate, ethoxylated propoxylated pentaerythritol tetra(meth)acrylate, ditrimethylolpropane tetraacrylate, dipentaerythritol hexa(meth) acrylate and the like; heterocyclic (meth)acrylates such as ethoxylated isocyanuric acid tri(meth)acrylate, propoxylated isocyanuric acid tri(meth)acrylate, ethoxylated propoxylated isocyanuric acid tri(meth)acrylate and the like; caprolactone-modified compounds thereof; and aromatic epoxy (meth) acrylates such as phenol novolak type epoxy (meth)acrylate, cresol novolak type epoxy (meth)acrylate and the like.

Among them, the heterocyclic (meth)acrylates and the aromatic epoxy (meth)acrylates each described above are preferred from the viewpoints of the transparency and the heat resistance.

The above compounds can be used alone or in combination of two or more kinds thereof, and they can be used as well in combination with other polymerizable compounds.

The preferred polymerizable compound (B) includes as well compounds having two or more epoxy groups in a molecule thereof in addition to the (meth)acrylates and the aryl vinyls from the viewpoint of a compatibility thereof with (A) the phenoxy resin for an optical material.

To be specific, they include difunctional phenol glycidyl ethers such as bisphenol A type epoxy resins, tetrabromobisphenol A type epoxy resins, bisphenol F type epoxy resins, bisphenol AF type epoxy resins, bisphenol AD type epoxy resins, biphenyl type epoxy resins, naphthalene type epoxy resins, fluorene type epoxy resins and the like; hydrogenated difunctional phenol glycidyl ethers such as hydrogenated bisphenol A type epoxy resins, hydrogenated bisphenol F type epoxy resins, hydrogenated 2,2'-biphenol type epoxy resins, hydrogenated 4,4'-biphenol type epoxy resins and the like; polyfunctional phenol glycidyl ethers such as phenol novolak type epoxy resins, cresol novolak type epoxy resins, dicyclopentadiene-phenol type epoxy resins, tetraphenylolethane type epoxy resins and the like; difunctional aliphatic alcohol glycidyl ethers such as polyethylene glycol type epoxy resins, polypropylene glycol type epoxy resins, neopentyl glycol type epoxy resins, 1,6-hexanediol type epoxy resins and the like; difunctional alicyclic alcohol glycidyl ethers such as cyclohexanedimethanol type epoxy resins, tricyclodecanedimethanol type epoxy resins and the like; polyfunctional aliphatic alcohol glycidyl ethers such as trimethylolpropane type epoxy resins, sorbitol type epoxy resin, glycerin type epoxy resins and the like; difunctional aromatic glycidyl esters such as diglycidyl phthalate and the like; difunctional alicyclic glycidyl esters such as diglycidyl tetrahydrophthalate, diglycidyl hexahydrophthalate and the like; difunctional aromatic glycidylamines such as N,N-diglycidylaniline, N,N-diglycidyltrifluoromethylaniline and the like; polyfunctional aromatic glycidylamines such as N,N,N',N'-tetraglycidyl-4,4-diaminodiphenylmethane, 1,3-bis(N,N-glycidylaminomethyl)cyclohexane, N,N,O-triglycidyl-p-aminophenol and the like; difunctional alicyclic epoxy resins such as alicyclic diepoxy acetal, alicyclic diepoxy adipate, alicyclic diepoxy carboxylate, vinyl cyclohexene dioxide and the like; polyfunctional alicyclic epoxy resins such as 1,2-epoxy-4-(2-oxiranyl)cyclohexane adducts of 2,2-bis(hydroxymethyl)-1-butanol and the like; polyfunctional heterocyclic epoxy resins such as triglycidyl isocyanurate and the like; and difunctional or polyfunctional silicon-containing epoxy resins such as organopolysiloxane type epoxy resins and the like.

Among them, preferred from the viewpoints of the transparency and the heat resistance are the difunctional phenol glycidyl ethers such as bisphenol A type epoxy resins, bisphenol F type epoxy resins, bisphenol AF type epoxy resins, bisphenol AD type epoxy resins, biphenyl type epoxy resins, naphthalene type epoxy resins and fluorene type epoxy resins; the hydrogenated difunctional phenol glycidyl ethers described above; the polyfunctional phenol glycidyl ethers described above; the difunctional alicyclic alcohol glycidyl ethers described above; the difunctional aromatic glycidyl esters described above; the difunctional alicyclic glycidyl esters described above; the difunctional alicyclic epoxy resins described above; the polyfunctional alicyclic epoxy resins described above; the polyfunctional heterocyclic epoxy resins described above; and the difunctional or polyfunctional silicon-containing epoxy resins described above.

The above compounds can be used alone or in combination of two or more kinds thereof, and they can be used as well in combination with other polymerizable compounds.

Among the above polymerizable compounds, the compounds having at least one selected from the group consisting of an alicyclic structure, an aryl group, an aryloxy group and an aralkyl group in a molecule are preferably used from the viewpoint of the heat resistance. To be specific, they include (meth)acrylates having at least one selected from the group consisting of an alicyclic structure, an aryl group, an aryloxy group and an aralkyl group, aryl vinyls and the alicyclic compounds described above having two or more epoxy groups in a molecule. In this regard, the aryl group shows, for example, aromatic hydrocarbon groups such as phenyl, naphthyl and the like and aromatic heterocyclic groups such as carbazole and the like.

The (meth)acrylates having at least one selected from the group consisting of an alicyclic structure, an aryl group, an aryloxy group and an aralkyl group include monofunctional aromatic (meth)acrylates such as benzyl (meth)acrylate, phenyl (meth)acrylate, o-biphenyl (meth)acrylate, 1-naphthyl (meth)acrylate, 2-naphthyl (meth)acrylate, phenoxyethyl (meth)acrylate, p-cumylphenoxyethyl (meth)acrylate, o-phenylphenoxyethyl (meth)acrylate, 1-naphthoxyethyl (meth) acrylate, 2-naphthoxyethyl (meth)acrylate, 2-(meth)acryloxyethyl-N-carbazole, 2-hydroxy-3-(o-phenylphenoxy) propyl (meth)acrylate, 2-hydroxy-3-(1-naphthoxy)propyl (meth)acrylate, 2-hydroxy-3-(2-naphthoxy)propyl (meth) acrylate, mono(2-(meth)acryloyloxyethyl) phthalate and the like; the difunctional aromatic (meth)acrylates described above; the monofunctional and difunctional alicyclic (meth) acrylates described above; the difunctional alicyclic epoxy (meth)acrylates described above; the difunctional aromatic epoxy (meth)acrylates described above and the tri- or more polyfunctional aromatic epoxy (meth)acrylates described above.

The aryl vinyls include N-vinylcarbazole and the like.

A blending amount of the polymerizable compound (B) is preferably 15 to 90 mass % based on the total amount of the component (A) and the component (B). If it is 15 mass % or more, the component (B) readily entangles therein the component (A) and is cured in exposure, and the sufficiently high solvent resistance is obtained. If it is 90 mass % or less, the cured matter having a sufficiently large strength and a sufficiently high flexibility is obtained. From the viewpoints described above, the blending amount is more preferably 20 to 90 mass %, particularly preferably 30 to 80 mass %.

The polymerization initiator (C) of the present invention shall be explained below.

The polymerization initiator (C) of the present invention shall not specifically be restricted as long as it initiates polymerization by heat or irradiation with a UV ray and the like, and when a compound having an ethylenically unsaturated group is used as the polymerizable compound (B), the polymerization initiator (C) includes, for example, heat radical polymerization initiators, photoradical polymerization initiators and the like. The photoradical polymerization initiators are preferably used since they provide a rapid curing rate and make curing at room temperature possible.

The heat radical polymerization initiators include, for example, ketone peroxides such as methyl ethyl ketone peroxide, cyclohexanone peroxide, methylcyclohexanone peroxide and the like; peroxy ketals such as 1,1-bis(t-butylperoxy)cyclohexane, 1,1-bis(t-butylperoxy)-2-methylcyclohexane, 1,1-bis(t-butylperoxy)-3,3,5-trimethylcyclohexane, 1,1-bis(t-hexylperoxy)cyclohexane, 1,1-bis(t-hexylperoxy)-3,3,5-trimethylcyclohexane and the like; hydroperoxides such as p-menthane hydroperoxide and the like; dialkyl peroxides such as α,α'-bis(t-butylperoxy) diisopropylbenzene, dicumyl peroxide, t-butylcumyl peroxide, di-t-butyl peroxide and the like; diacyl peroxides such as octanoyl peroxide, lauroyl peroxide, stearyl peroxide, benzoyl peroxide and the like; peroxy carbonates such as bis(4-t-butylcyclohexyl)peroxy dicarbonate, di-2-ethoxyethylperoxy dicarbonate, di-2-ethylhexylperoxy dicarbonate, di-3-methoxybutylperoxy carbonate and the like; peroxy esters such as t-butylperoxy pivalate, t-hexylperoxy pivalate, 1,1,3,3-tetramethylbutylperoxy 2-ethylhexanoate, 2,5-dimethyl-2,5-bis(2-ethylhexanoylperoxy)hexane, t-hexylperoxy 2-ethylhexanoate, t-butylperoxy 2-ethylhexanoate, t-butylperoxy isobutyrate, t-hexylperoxy isopropyl monocarbonate, t-butylperoxy-3,5,5-trimethyl hexanoate, t-butylperoxy laurate, t-butylperoxy isopropyl monocarbonate, t-butylperoxy 2-ethylhexyl monocarbonate, t-butylperoxy benzoate, t-hexylperoxy benzoate, 2,5-dimethyl-2,5-bis(benzolyperoxy)hexane, t-butylperoxy acetate and the like; and azobisalkylnitriles such as 2,2'-azobisisobutyronitrile, 2,2'-azobis(2,4-dimethylvaleronitrile), 2,2'-azobis(4-methoxy-2'-dimethylvaleronitrile) and the like.

Among them, preferred from the viewpoints of the curing property, the transparency and the heat resistance are the diacyl peroxides described above; peroxy esters such as 1,1,3,3-tetramethylbutylperoxy 2-ethylhexanoate, 2,5-dimethyl-2,5-bis(2-ethylhexanoylperoxy)hexane, t-hexylperoxy 2-ethylhexanoate, t-butylperoxy 2-ethylhexanoate, t-butylperoxy isobutyrate, t-hexylperoxy isopropyl monocarbonate, t-butylperoxy-3,5,5-trimethyl hexanoate, t-butylperoxy laurate, t-butylperoxy isopropyl monocarbonate, t-butylperoxy 2-ethylhexyl monocarbonate, t-butylperoxy benzoate, t-hexylperoxy benzoate, 2,5-dimethyl-2,5-bis(benzoylperoxy)hexane, t-butylperoxy acetate and the like; and the azobisalkylnitriles described above.

The photoradical polymerization initiators include, for example, benzoin ketals such as 2,2-dimethoxy-1,2-diphenylethane-1-one and the like; α-hyroxyketones such as 1-hydroxycyclohexyl phenyl ketone, 2-hydroxy-2-methyl-1-phenylpropane-1-one, 1-[4-(2-hydroxyethoxy)phenyl]-2-hydroxy-2-methyl-1-propane-1-one and the like; α-amionoketone such as 2-benzyl-2-dimethylamino-1-(4-morpholinophenyl)-butane-1-one, 1,2-methyl-1-[4-(methylthio)phenyl]-2-morpholinopropane-1-one and the like; oxime esters such as 1-[(4-phenylthio)phenyl]-1,2-octanedione-2-(benzoyl) oxime and the like; phosphine oxides such as bis(2,4,6-trimethylbenzoyl)phenylphosphine oxide, bis(2,6-dimethoxybenzoyl)-2,4,4-trimethylpentylphosphine oxide, 2,4,6-trimethylbenzoyldiphenylphosphine oxide and the like; 2,4,5-triarylimidazole dimers such as 2-(o-chlorophenyl)-4,5-diphenylimidazole dimer, 2-(o-chlorophenyl)-4,5-di(methoxyphenyl)imidazole dimer, 2-(o-fluorophenyl)-4,5-diphenylimidazole dimer, 2-(o-methoxyphenyl)-4,5-diphenylimidazole dimer, 2-(p-methoxyphenyl)-4,5-diphenylimidazole dimer and the like; benzophenones such as benzophenone, N,N'-tetramethyl-4,4'-diaminobenzophenone, N,N'-tetraethyl-4,4'-diaminobenzophenone, 4-methoxy-4'-dimethylaminobenzophenone and the like; quinones such as 2-ethylanthraquinone, phenanthrenequinone, 2-tert-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone, 2,3-dimethylanthraquinone and the like; benzoin ethers such as benzoin methyl ether, benzoin ethyl ether, benzoin phenyl ether and the like; benzoins such as benzoin, methylbenzoin, ethylbenzoin and the like; benzyls such as benzyl dimethyl ketal and the like; acridines such as 9-phenylacridine, 1,7-bis(9,9'-acridinylheptane) and the like; N-phenylglycine, coumarin and the like.

Further, in the 2,4,5-triarylimidazole dimer described above, two triarylimidazole sites may have the same substituents on the aryl groups to provide the symmetric compound or may have different substituents on the aryl groups to provide the asymmetric compound.

As is the case with combination of diethylthioxanthone and dimethylaminobenzoic acid, thioxanthones and tertiary amines may be combined.

Among them, they are preferably the α-hyroxyketones and the phosphine oxides each described above from the viewpoints of the curing property, the transparency and the heat resistance.

The above heat radical polymerization and photoradical polymerization initiators can be used alone or in combination of two or more kinds thereof.

Further, they can be used in combination with suited sensitizers.

When an epoxy resin is used as the polymerizable compound (B), the polymerization initiator of the component (C) includes, for example, heat cationic polymerization initiators, photocationic polymerization initiators and the like. The photocationic polymerization initiators are preferably used since they provides a rapid curing rate and makes curing at room temperature possible.

The heat cationic polymerization initiators include, for example, bezylsulfonium salts such as p-alkoxyphenylbezylmethylsulfonium hexafluoroantimonate and the like; pyridinium salts such as benzyl-p-cyanopyridinium hexafluoroantimonate, 1-naphthyl-o-cyanopyridinium hexafluoroantimonate, cinnamyl-o-cyanopyridinium hexafluoroantimonate and the like; and bezylammonium salts such as bezyldimethylphenylammonium hexafluoroantimonate and the like.

Among them, they are preferably the bezylsulfonium salts described above from the viewpoints of the curing property, the transparency and the heat resistance.

The photocationic polymerization initiators include, for example, aryldiazonium salts such as p-methoxybenzenediazonium hexafluorophosphate and the like; diaryliodonium salts such as diphenyliodonium hexafluorophosphate, diphenyliodonium hexafluoroantimonate and the like; triarylsulfonium salts such as triphenylsulfonium hexafluorophosphate, triphenylsulfonium hexafluoroantimonate, diphenyl-4-thiophenoxyphenylsulfonium hexafluorophosphate, diphenyl-4-thiophenoxyphenylsulfonium hexafluoroantimonate, diphenyl-4-thiophenoxyphenylsulfonium pentafluorohydroxyantimonate and the like; triarylselenonium salts such as triphenylselenonium hexafluorophosphate, triphenylselenonium tetrafluoroborate, triphenylselenonium hexafluoroantimonate and the like; dialkylphenacylsulfonium salts such as dimethylphenacylsulfonium hexafluoroantimonate, diethylphenacylsulfonium hexafluoroantimonate and the like; dialkyl-4-hydroxy salts such as 4-hydroxyphenyldimethylsulfonium hexafluoroantimonate, 4-hydroxyphenylbenzylmethylsulfonium hexafluoroantimonate and the like; and sulfonic acid esters such as α-hydroxymethylbenzoinsulfonates, N-hydroxyimidosulfonates, α-sulfonyloxyketone, β-sulfonyloxyketone and the like.

Among them, they are preferably the triarylsulfonium salts described above from the viewpoints of the curing property, the transparency and the heat resistance.

The above heat and photoradical polymerization initiators can be used alone or in combination of two or more kinds thereof.

Further, they can be used in combination with suited sensitizers.

A blending amount of the polymerization initiator (C) of the present invention is preferably 0.1 to 10 mass % based on the total amount of the component (A) and the component (B). If it is 0.1 mass % or more, curing is satisfactory, and if it is 10 mass % or less, the sufficiently high light transmittance is obtained. From the viewpoints described above, the blending amount is more preferably 0.3 to 7 mass %, particularly preferably 0.5 to 5 mass %.

Further, so-called additives such as antioxidants, yellowing preventives, UV absorbents, visible light absorbing agents, coloring agents, plasticizers, stabilizers, fillers and the like may be added, if necessary, to the resin composition for forming optical parts according to the present invention in a proportion in which adverse influence is not exerted to the effects of the present invention.

The resin composition for an optical material according to the present invention may be diluted with a suited organic solvent and used in the form of a resin varnish for an optical material. The organic solvent used above includes, for example, tetrahydrofuran, methanol, ethanol, isopropanol, acetone, methyl ethyl ketone, methyl isobutyl ketone, cyclohexanone, ethyl acetate, butyl acetate, γ-butyrolactone, methyl lactate, ethyl lactate, methyl cellosolve, ethyl cellosolve, butyl cellosolve, ethyl cellosolve acetate, propylene glycol monomethyl ether, propylene glycol monomethyl ether acetate, toluene, xylene, N,N-dimethylformamide, N,N-dimethylacetamide, N-methylpyrrolidone and the like.

Among them, methyl ethyl ketone, methyl isobutyl ketone, cyclohexanone, methyl lactate, ethyl lactate, ethyl cellosolve, propylene glycol monomethyl ether, propylene glycol monomethyl ether acetate, toluene, xylene and N,N-dimethylacetamide are preferred from the viewpoints of a solubility and a boiling point.

The above solvents can be used alone or in combination of two or more kinds thereof.

Usually, a solid matter concentration in the resin varnish is preferably 20 to 80 mass %.

In preparing the resin varnish for an optical material, it is mixed preferably by stirring. The stirring method shall not specifically be restricted, and stirring carried out by using a propeller is preferred from the viewpoint of a stirring efficiency. A rotating speed of the propeller in stirring shall not specifically be restricted, and it is preferably 10 to 1,000 rpm. If it is 10 rpm or more, the respective components of the components (A) to (C) and the organic solvent are sufficiently mixed, and if it is 1,000 rpm or less, air bubbles produced by rotation of the propeller are less mixed in. From the viewpoints described above, the evolution is more preferably 50 to 800 rpm, particularly preferably 100 to 500 rpm. The stirring time shall not specifically be restricted, and it is preferably 1 to 24 hours. If it is 1 hour or longer, the respective components of the components (A) to (C) and the organic solvent are sufficiently mixed, and if it is 24 hours or shorter, time for preparing the varnish can be shortened.

The resin varnish for an optical material prepared is preferably filtrated through a filter having a pore diameter of 50 μm or less. If the pore diameter is 50 μm or less, large foreign matters are removed, and cissing is not caused in coating the varnish, and light transmitted through the core part is prevented from being scattered. From the viewpoints described above, the resin varnish is filtrated through the filter having a pore diameter of more preferably 30 μm or less, particularly preferably 10 μm or less.

The resin varnish for an optical material prepared is preferably defoamed under reduced pressure. The defoaming method shall not specifically be restricted, and a combination of a vacuum pump and a bell jar, a deforming apparatus equipped with a vacuum device can be used as the specific examples thereof. The pressure in the pressure reduction shall not specifically be restricted, and pressure at which the organic solvent contained in the resin varnish is not boiled is preferred. The time for defoaming under reduced pressure shall not specifically be restricted, and it is preferably 3 to 60 minutes. If it is 3 minutes or longer, air bubbles dissolved in the resin varnish can be removed, and if it is 60 minutes or shorter, the solvent contained in the resin varnish is inhibited from being volatized.

A cured film prepared by polymerizing and curing the resin composition for an optical material comprising (A) the phenoxy resin for an optical material, (B) the polymerizable compound and (C) the polymerization initiator according to the present invention has preferably a refractive index of 1.300 to 1.600 at 25° C. and a wavelength of 830 nm. If it is 1.300 to 1.600, it is not different from a refractive index of conventional optical resins to a large extent, and therefore a general versatility thereof as an optical material is not damaged. From the viewpoints described above, the refractive index is more preferably 1.325 to 1.575, particularly preferably 1.350 to 1.550.

A cured film having a thickness of 50 μm prepared by polymerizing and curing the resin composition for an optical material comprising (A) the phenoxy resin for an optical material, (B) the polymerizable compound and (C) the polymerization initiator according to the present invention has preferably a transmission factor of 80% or more at 25° C. and a wavelength of 400 nm. If it is 80% or more, a transmission amount of light is satisfactory. From the viewpoint described above, the transmission factor is more preferably 85% or more. An upper limit of the transmission factor shall not specifically be restricted. The transmission factor described above can be measured by means of a commercially available spectrophotometer describe in an example describe later.

The resin film for an optical material according to the present invention shall be explained below.

The resin film for an optical material according to the present invention comprises the resin composition for an optical material described above. A production process for the above resin film shall not specifically be restricted, and it can readily be produced by applying the resin varnish for an optical material described above on a suited substrate and removing the solvent. Alternatively, it may be produced by applying the resin composition for an optical material directly on a substrate.

The substrate film shall not specifically be restricted and includes, for example, polyesters such as polyethylene terephthalate, polybutylene terephthalate, polyethylene naphthalate and the like; polyolefins such as polyethylene, polypropylene and the like; polycarbonate, polyamide, polyimide, polyamideimide, polyetherimide, polyether sulfide, polyethersulfone, polyether ketone, polyphenylene ether, polyphenylene sulfide, polyallylate, polysulfone, liquid crystal polymers and the like. Among them, preferred from the viewpoints of a flexibility and a toughness are polyethylene terephthalate, polybutylene terephthalate, polyethylene naphthalate, polypropylene, polycarbonate, polyamide, polyimide, polyamideimide, polyphenylene ether, polyphenylene sulfide, polyallylate and polysulfone.

A thickness of the substrate film may suitably be changed according to the targeted flexibility, and it is preferably 3 to 250 μm. If it is 3 μm or more, a strength of the film is sufficiently high, and if it is 250 μm or less, the sufficiently large flexibility is obtained. From the viewpoints described above, the thickness is more preferably 5 to 200 μm, particularly preferably 7 to 150 μm. From the viewpoint of enhancing a peeling property from the resin layer, the film subjected to mold release treatment by a silicone base compound, a fluorine-containing compound and the like may be used if necessary.

The resin film for an optical material produced by applying the resin varnish for an optical material or the resin composition for an optical material on the substrate may be provided, if necessary, with a protective layer stuck on the resin layer to assume a three layer structure comprising the substrate film, the resin layer and the protective layer.

The protective layer shall not specifically be restricted and includes, for example, polyesters such as polyethylene terephthalate, polybutylene terephthalate, polyethylene naphthalate and the like; and polyolefins such as polyethylene, polypropylene and the like. Among them, the polyesters such as polyethylene terephthalate and the polyolefins such as polyethylene and polypropylene are preferred from the viewpoints of a flexibility and a toughness. From the viewpoint of enhancing a peeling property from the resin layer, the film subjected to mold release treatment by a silicone base compound, a fluorine-containing compound and the like may be used if necessary. A thickness of the cover film may be changed according to the targeted flexibility, and it is preferably 10 to 250 μm. If it is 10 μm or more, a strength of the film is sufficiently high, and if it is 250 μm or less, the sufficiently large flexibility is obtained. From the viewpoints described above, the thickness is more preferably 15 to 200 μm, particularly preferably 20 to 150 μm.

A thickness of the resin layer in the resin film for an optical material according to the present invention shall not specifically be restricted and, and usually it is preferably 5 to 500 μm in terms of a thickness after drying. If it is 5 μm or more, the thickness is sufficiently large, and therefore a strength of the resin film or the cured matter obtained from the above film is sufficiently high. On the other hand, if it is 500 μm or less, the resin film can sufficiently be dried. Accordingly, an amount of the solvent remaining in the resin film is not increased, and the cured matter of the above film is not foamed when heated.

The resin composition for an optical material according to the present invention is suited for a resin composition for forming an optical waveguide, and similarly the resin film for an optical material according to the present invention is suited for a resin film for forming an optical waveguide.

The optical waveguide of the present invention shall be explained below.

A cross-sectional drawing of an optical waveguide is shown in (a) of FIG. 1. An optical waveguide 1 is formed on a substrate 5 and constituted from a core part 2 having a high refractive index which comprises a resin composition for forming a core part and a lower cladding layer 4 and an upper cladding layer 3 which have a low refractive index and comprise a resin composition for forming a cladding layer. The resin composition for an optical material and the resin film for an optical material according to the present invention are used preferably for at least one of the lower cladding layer 4, the core part 2 and the upper cladding layer 3.

Use of the resin film for an optical material makes it possible to enhance more an interlayer close adhesiveness between the cladding and the core and a pattern formability (corresponding property between fine lines or narrow lines) in forming a core pattern of the optical waveguide and makes it possible to form fine patterns having a small line width and a small line space. Further, it makes it possible to provide a process having an excellent productivity in which the optical waveguides having a large area can be produced at the same time.

In the optical waveguide 1 described above, a hard substrate such as a silicon substrate, a glass substrate, a glass epoxy resin substrate including an FR-4 substrate and the like can be used for the substrate 5.

The optical waveguide 1 may be a flexible optical waveguide prepared by using a substrate film such as a resin film having a flexibility in place of the substrates described above. In this case, the substrate film shall not specifically be restricted, and suited from the viewpoints of a flexibility and a toughness are, for example, polyesters such as polyethylene terephthalate, polybutylene terephthalate, polyethylene naphthalate and the like, polyethylene, polypropylene, polycarbonate, polyamide, polyimide, polyamideimide, polyetherimide, polyphenylene ether, polyether sulfide, polyethersulfone, polyether ketone, polyallylate, liquid crystal polymers, polysulfone and the like.

A thickness of the substrate film can suitably be changed according to the targeted flexibility, and it falls preferably in a range of 5 to 250 μm. If it is 5 μm or more, a sufficiently high strength of the film is obtained, and if it is 250 μm or less, the sufficiently large flexibility is obtained.

Also, the substrate 5 may be allowed to function as a cover film. Disposition of a cover film 5 makes it possible to provide the optical waveguide 1 with a flexibility and a toughness of the above cover film 5. Further, it makes the optical waveguide 1 unsusceptible to stains and scratches, and therefore the handling property is improved. From the viewpoints described above, the cover film 5 may be disposed at an outside of the upper cladding layer 3 as shown in FIG. 1 (*b*), and the cover film 5 may be disposed at both outsides of the lower cladding layer 4 and the upper cladding layer 3 as shown in FIG. 1 (*c*).

If the optical waveguide 1 is sufficiently endowed with a flexibility and a toughness, the cover film 5 may not be disposed as shown in FIG. 1 (*d*).

A thickness of the lower cladding layer 4 shall not specifically be restricted, and it is preferably 2 to 200 μm. If it is 2 μm or more, a transmitted light is readily shut in an inside of the core, and if it is 200 μm or less, a thickness of the whole optical waveguide 1 is prevented from being too large. From the viewpoints described above, the thickness is more preferably 5 to 150 μm, particularly preferably 10 to 100 μm. A thickness of the lower cladding layer 4 is a value measured from a boundary between the core part 2 and the lower cladding layer 4 to an under face of the lower cladding layer 4.

A thickness of the resin film for forming a lower cladding layer shall not specifically be restricted, and the thickness is controlled so that a thickness of the lower cladding layer 4 after cured falls in the range described above.

A height of the core part shall not specifically be restricted, and it is preferably 10 to 100 μm. If a height of the core part is 10 μm or more, a positioning tolerance is prevented from being decreased in coupling with light emitting and light-sensitive elements or an optical fiber, and if it is 100 μm or less, a coupling efficiency is prevented from being reduced in coupling with light emitting and light-sensitive elements or an optical fiber. From the viewpoints described above, a height of the core part is more preferably 20 to 80 μm, particularly preferably 30 to 70 μm. A thickness of the resin film for forming a core part shall not specifically be restricted, and the thickness is controlled so that a height of the core part after cured falls in the range described above.

A thickness of the upper cladding layer 3 shall not specifically be restricted as long as it falls in a range in which the core part 2 can be embedded, and it is preferably 10 to 500 μm in terms of a thickness after curing. A thickness of the upper cladding layer 3 may be the same as or different from a thickness of the lower cladding layer 4 formed at the beginning. From the viewpoint of embedding the core part 2, a thickness of the upper cladding layer 3 is preferably larger than a thickness of the lower cladding layer 4. From the viewpoints described above, a thickness of the upper cladding layer 3 is more preferably 20 to 300 μm, particularly preferably 30 to 200 μm. A thickness of the upper cladding layer 3 is a value measured from a boundary between the core part 2 and the lower cladding layer 4 to an upper face of the upper cladding layer 3.

In the optical waveguide of the present invention, an optical transmission loss is preferably 0.3 dB/cm or less. If it is 0.3 dB/cm or less, a loss of light is reduced, and an intensity of transmission signals is sufficiently large. From the viewpoints described above, the optical transmission loss is more preferably 0.25 dB/cm or less, particularly preferably 0.20 dB/cm or less. Further, in the optical waveguide of the present invention, an optical transmission loss after carrying out three times a reflow test at a maximum temperature of 265° C. is preferably 0.3 dB/cm or less. If it is 0.3 dB/cm or less, a loss of light is reduced, and an intensity of transmission signals is sufficiently large. In addition thereto, parts can be mounted in a reflow process, and therefore use range thereof is broadened. From the viewpoints described above, the optical transmission loss is more preferably 0.25 dB/cm or less, particularly preferably 0.20 dB/cm or less. The reflow test at a maximum temperature of 265° C. means a lead-free solder reflow test carried out on conditions according to a JEDE standard (JEDE JESD22A113E).

An application example carried out by using the resin film for an optical material according to the present invention as a resin film for forming an optical waveguide which is the most suitable use shall be described below in details.

The resin film for forming an optical waveguide can be produced as well by the same process as in the resin film for an optical material described above.

A substrate used in a step for producing a resin film for forming a core part shall not specifically be restricted as long as it is transmitted by an actinic ray for exposure which is used for forming core patterns described later, and it includes, for example, polyesters such as polyethylene terephthalate, polybutylene terephthalate, polyethylene naphthalate and the like; polyolefins such as polyethylene, polypropylene and the like; polycarbonate, polyphenylene ether, polyallylate and the like. Among them, the polyesters such as polyethylene terephthalate, polybutylene terephthalate, polyethylene naphthalate e and the like and the polyolefins such as polypropylene and the like are preferred from the viewpoints of a transmission factor of an actinic ray for exposure, a flexibility and a toughness. Further, a substrate film of a high transparent type is more preferably used from the viewpoints of enhancing a transmission factor of an actinic ray for exposure and reducing roughening of side walls of the core patterns. The above substrate film of a high transparent type includes Cosmo Shine A1517 and Cosmo Shine A4100 each manufactured by Toyobo Co., Ltd. From the viewpoint of enhancing a peeling property from the resin layer, the film subjected to mold release treatment by a silicone base compound, a fluorine-containing compound and the like may be used if necessary.

A thickness of the substrate film in the resin film for forming a core part falls preferably in a range of 5 to 50 μm. If it is 5 μm or more, a strength thereof as a support is sufficiently high. On the other hand, if it is 50 μm or less, a gap between the photo mask and the resin composition for forming a core part in forming the core patterns is prevented from being increased, and the pattern formability is good. From the viewpoints described above, a thickness of the substrate film falls in a range of more preferably 10 to 40 μm, particularly preferably 15 to 30 μm. The film for forming an optical waveguide provided on the substrate thus obtained can readily be stored by, for example, reeling in a roll form. Alternatively, the roll-shaped film can be stored as well in a sheet form by cutting the film in a suited size.

A production process in which the resin film for forming an optical waveguide is used for the lower cladding layer, the core part and the upper cladding layer to form an optical waveguide shall explained below.

First, in a first step, a resin film for forming a lower cladding layer is laminated on a substrate 5 to form a lower cladding layer 4. The laminating method includes a method in which the resin film is bonded under pressure by means of a roll laminator or a flat plate-type laminator while heating, and from the viewpoint of a tight adhesiveness and a followability, the resin film for forming a lower cladding layer is preferably laminated under reduced pressure by means of the flat plate-type laminator. In the present invention, the flat plate-type laminator means such a laminator having a pair of flat plates between which materials to be laminated are sandwiched and press-bonded to each other by applying a pressure to the flat plates. For example, a vacuum pressure type laminator can suitably be used as the flat plate-type laminator. In this regard, the heating temperature is preferably 50 to 130° C., and the bonding pressure is preferably 0.1 to 1.0 MPa (1 to 10 kgf/$cm^2$), but these conditions shall not specifically be restricted.

Before lamination by the vacuum pressure type laminator, the resin film for forming a lower cladding layer may be preliminarily attached onto the substrate 5 by means of a roll laminator. In this regard, it is preliminarily attached preferably while press-bonding from the viewpoint of enhancing a tight adhesiveness and a followability. In bonding under pressure, it may be carried out while heating by means of a laminator having a heat roll. The laminate temperature falls preferably in a range of room temperature (25° C.) to 150° C. If it is room temperature (25° C.) or higher, a tight adhesiveness between the lower cladding layer 4 and the core part is improved, and if it is 150° C. or lower, the needed film thickness is obtained without allowing the core part to flow in roll lamination. From the viewpoints described above, the laminate temperature falls more preferably in a range of 40 to 130° C. The pressure is preferably 0.2 to 0.9 MPa, and the laminate speed is preferably 0.1 to 3 m/minute, but these conditions shall not specifically be restricted.

When a protective film is present on the resin film for forming a lower cladding layer, the resin film is laminated after removing the protective film.

Then, the resin film for forming a lower cladding layer is cured by light and/or heating. In this regard, an irradiation dose of an actinic ray in forming the lower cladding layer 4 is preferably 0.1 to 5 $J/cm^2$, and the heating temperature is preferably 50 to 130° C., but these conditions shall not specifically be restricted. When the substrate film of the resin film for forming a lower cladding layer has to be removed, it may be removed either before or after curing the resin film for forming a lower cladding layer.

Next, in a second step, a resin film for forming a core part is laminated on the lower cladding layer 4 to form a core part. In this second step, the resin film for forming a core part is bonded on the lower cladding layer 4 described above under pressure while heating to thereby form the core part having a higher refractive index than that of the lower cladding layer 4. In this respect, the resin film for forming a core part is designed so that it has a higher refractive index than that of the resin film for forming a lower cladding layer, and it is preferably a light-sensitive resin composition which can form a core pattern by irradiating with an actinic ray.

The laminate method in the second step includes a method carried out by means of a roll laminator or a flat plate-type laminator, and from the viewpoint of a tight adhesiveness, a followability and a flatness, the resin film for forming a core part layer is preferably laminated under reduced pressure, as is the case with the first step, by means of the flat plate-type laminator, suitably a vacuum pressure type laminator. In this regard, the heating temperature is preferably 50 to 130° C., and the bonding pressure is preferably 0.1 to 1.0 MPa (1 to 10 $kgf/cm^2$), but these conditions shall not specifically be restricted.

Before lamination by the vacuum pressure type laminator, the resin film for forming a core part be preliminarily attached onto the lower cladding layer 4 by means of a roll laminator. In this regard, it is preliminarily attached preferably while press-bonding from the viewpoint of enhancing a tight adhesiveness and a followability. In bonding under pressure, it may be carried out while heating by means of a laminator having a heat roll. The laminate temperature falls preferably in a range of room temperature (25° C.) to 150° C. If it is room temperature (25° C.) or higher, a tight adhesiveness between the lower cladding layer 4 and the core part is improved, and if it is 150° C. or lower, the needed film thickness is obtained without allowing the core part to flow in roll lamination. From the viewpoints described above, the laminate temperature falls more preferably in a range of 40 to 130° C. The pressure is preferably 0.2 to 0.9 MPa, and the laminate speed is preferably 0.1 to 3 m/minute, but these conditions shall not specifically be restricted.

When a protective film is present on the resin film for forming a core part, the resin film is laminated after removing the protective film.

Next, in a third step, the core part is exposed to a light and developed to form a core pattern (core part 2). To be specific, an actinic ray is irradiated in an image-like manner through a negative or positive mask pattern which is called an art work. Further, an actinic ray may be irradiated on an image by laser direct drawing without passing through a photo mask. A light source for the actinic ray includes, for example, publicly known light sources which effectively irradiate a UV ray such as a carbon arc lamp, a mercury vapor arc lamp, a ultra-high pressure mercury lamp, a high pressure mercury lamp, a Xenon lamp and the like. In addition thereto, it includes as well light sources which effectively irradiate a visible light such as a flood bulb for photography, a sunlight lamp and the like.

An irradiation dose of the actinic ray is preferably 0.01 to 10 $J/cm^2$. If it is 0.01 $J/cm^2$ or more, curing reaction proceeds sufficiently, and the core pattern is prevented from flowing in a developing step described later. If it is 10 $J/cm^2$ or less, the core pattern is prevented from growing larger by an excess exposure dose, and fine patterns can suitably be formed. From the viewpoints described above, the irradiation dose falls in a range of more preferably 0.05 to 5 $J/cm^2$, particularly preferably 0.1 to 2 $J/cm^2$.

After-exposure heating may be carried out after exposure from the viewpoints of enhancing the resolution and the core pattern tight adhesiveness. Time spent from irradiation with a UV ray to after-exposure heating is preferably a range of 30 seconds to 10 minutes. If the time falls in the above range, activated species produced by irradiation with a UV ray are prevented from being deactivated. Temperature for after-exposure heating is preferably 40 to 160° C.

Next, the support film for the resin film for forming a core part is removed, and unexposed parts are removed by wet developing, dry developing or the like to carry out development, whereby a core pattern is formed.

In the case of wet development, development is carried out by a publicly known method such as, for example, spraying, brushing, scrubbing, shaking immersion and the like using a developer corresponding to the composition of the resin film for forming a core part described above, such as an organic solvent, an alkaline aqueous solution, a water base developer and the like. Two or more kinds of the developing methods may be used, if necessary, in combination. The developers which are safe and stable and which are handled well are preferably used.

The organic solvent base developer described above includes, for example, acetone, methanol, ethanol, isopropanol, methyl ethyl ketone, methyl isobutyl ketone, cyclohexanone, butyl acetate, ethyl lactate, γ-butyrolactone, methyl cellosolve, ethyl cellosolve, butyl cellosolve, propylene glycol monomethyl ether, propylene glycol monomethyl ether acetate, toluene, xylene, N,N-dimethylformamide, N,N-dimethylacetamide, N-methylpyrrolidone and the like. Among them, preferably used from the viewpoint of a solubility are methyl ethyl ketone, methyl isobutyl ketone, cyclohexanone, methyl lactate, ethyl lactate, γ-butyrolactone, ethyl cellosolve, butyl cellosolve, propylene glycol monomethyl ether, propylene glycol monomethyl ether acetate, N,N-dimethylacetamide and N-methylpyrrolidone.

The organic solvents described above can be used alone or in combination of two more kinds thereof, and from the viewpoint of controlling a solubility in the unexposed parts, the suitable organic solvents are used preferably in combination. The specific examples thereof suitably include combinations of propylene glycol monomethyl ether acetate/N,N-dimethylacetamide, propylene glycol monomethyl ether acetate/N-methylpyrrolidone, ethyl lactate/N,N-dimethylacetamide, ethyl lactate/N-methylpyrrolidone, γ-butyrolactone/N,N-dimethylacetamide and γ-butyrolactone/N-methylpyrrolidone.

Water can be added in a range of 1 to 20 mass % to the organic solvents described above in order to prevent ignition.

A base for the alkaline aqueous solution described above shall not specifically be restricted and includes, for example, alkali hydroxides such as hydroxides of lithium, sodium and potassium; alkali carbonates such as carbonates or bicarbonates of lithium, sodium, potassium and ammonium; alkali metal phosphates such as potassium phosphate, sodium phosphate and the like; alkali metal pyrophosphates such as sodium pyrophosphate, potassium pyrophosphate and the like; sodium salts such as borax, sodium metasilicate and the like; and organic bases such as tetramethylammonium hydroxide, triethanolamine, ethylenediamine, diethylenetriamine, 2-amino-2-hydroxymethyl-1,3-propanediol, 1,3-diaminopropanol-2-morpholine and the like. They can be used alone or in combination of two or more kinds thereof.

The alkaline aqueous solution used for the development has pH of falling in a range of preferably 9 to 13, more preferably 9 to 12 and particularly preferably 9 to 11. The temperature is controlled according to the developability of the layer of the resin composition for forming a core part. Further, the alkaline aqueous solution may be mixed with a surfactant, a defoaming agent, a small amount of an organic solvent for accelerating the development.

The water base developer described above shall not specifically be restricted as long as it comprises water or an alkaline aqueous solution and at least one kind of an organic solvent. The organic solvent described above includes, for example, triacetone alcohol, acetone, ethyl acetate, methanol, ethanol, isopropanol, butanol, methyl cellosolve, ethyl cellosolve, butyl cellosolve, diethylene glycol monomethyl ether, diethylene glycol monoethyl ether, diethylene glycol monobutyl ether and the like. They can be used alone or in combination of two or more kinds thereof.

Usually, a concentration of the organic solvent is preferably 2 to 90 mass %, and the temperature is controlled according to the developability of the layer of the resin composition for forming a core part.

A pH of the water base developer is preferably lowered as much as possible as long as the development of the resin film for forming a core part described above can sufficiently be carried out, and the pH is preferably 8 to 12, more preferably 9 to 11 and particularly preferably 9 to 10. Further, the alkaline aqueous solution may be mixed with small amounts of a surfactant, a defoaming agent and the like.

The core patterns in the optical waveguide may be washed for treatment after development by using the organic solvent shown above or water.

The organic solvent base washing solution includes, for example, acetone, methanol, ethanol, isopropanol, ethyl acetate, butyl acetate, ethyl lactate, γ-butyrolactone, methyl cellosolve, ethyl cellosolve, butyl cellosolve, propylene glycol monomethyl ether, propylene glycol monomethyl ether acetate, toluene, xylene and the like. Among them, methanol, ethanol, isopropanol and ethyl acetate are preferably used from the viewpoint of a solubility. They can be used alone or in combination of two or more kinds thereof.

Water can be added in a range of 1 to 20 mass % to the organic solvents described above in order to prevent ignition.

Further, the core patterns may be cured more, if necessary, by carrying out heating at 60 to 250° C. or exposure of 0.1 to 1000 mJ/$cm^2$ as treatment after exposing or washing.

Next, in a fourth step, a resin film for forming an upper cladding layer is laminated on the core pattern for embedding the core pattern and cured to form an upper cladding layer 3. The resin film for forming an upper cladding layer is designed so that it has a lower refractive index than that of the resin film for forming a core part. In this case, a thickness of the upper cladding layer 3 is preferably larger than a thickness of the core part.

The laminate method in the fourth step includes a method carried out by means of a roll laminator or a flat plate-type laminator, and from the viewpoint of a tight adhesiveness, a followability and a flatness, the resin film for forming an upper cladding layer is preferably laminated under reduced pressure, as is the case with the first and second steps, by means of the flat plate-type laminator, suitably the vacuum pressure type laminator. In this regard, the heating temperature is preferably 50 to 130° C., and the bonding pressure is preferably 0.1 to 1.0 MPa (1 to 10 kgf/$cm^2$), but these conditions shall not specifically be restricted.

When a protective film is present on the resin film for forming an upper cladding layer, the resin film is laminated after removing the protective film.

Curing in the fourth step is carried out, as is the case with the first step, by a light and/or heat. An irradiation dose of an actinic ray in forming the upper cladding layer 3 is preferably 0.1 to 30 J/$cm^2$.

When a support film in the resin film for forming a cladding layer described above is PET, an irradiation dose of an actinic ray is preferably 0.1 to 5 J/$cm^2$. On the other hand, when the above support film is polyethylene naphthalate, polyamide, polyimide, polyamideimide, polyetherimide, polyphenylene ether, polyether sulfide, polyether sulfone, polysulfone or the like, which hardly allow an actinic ray having a short wavelength such as a UV ray to pass through as compared with PET, therefore an irradiation dose of an actinic ray is preferably 0.5 to 30 J/$cm^2$. If it is 0.5 J/$cm^2$ or more, curing reaction proceeds sufficiently, and if it is 30 J/$cm^2$ or less, it does not take longer time for light irradiation. From the viewpoints described above, the irradiation dose is more preferably 3 to 27 J/$cm^2$, particularly preferably 5 to 25 J/$cm^2$.

In order to expedite curing more, a double face exposing machine in which both faces can be irradiated with an actinic ray at the same time can be used. Further, irradiation with an actinic ray may be carried out while heating. The heating temperature during and/or after irradiation with an actinic ray is preferably 50 to 200° C., but these conditions shall not specifically be restricted. When the substrate film of the resin film for forming an upper cladding layer has to be removed, it may be removed either before or after curing the resin film for forming an upper cladding layer.

EXAMPLES

The present invention shall more specifically be explained below with reference to examples and, but the present invention shall by no means be restricted to these examples.

Example 1

A flask equipped with a cooling tube was charged with 71.4 g (epoxy equivalent: 204 g/eq, 0.350 mole in terms of an epoxy group) of a hydrogenated bisphenol A type epoxy resin, 38.0 g (0.333 mole in terms of a phenolic hydroxyl group) of bisphenol A and 0.25 g (0.010 mole) of lithium hydroxide and charged with N,N-dimethylacetamide which was weighed so that a solid matter concentration in the reaction system was 40 mass %, and they were dissolved.

Then, the temperature in the reaction system was elevated up to 120° C. in an oil bath in one hour while stirring mechanically the above reaction solution, and the solution was stirred at 120° C. for 5 hours and then cooled down to obtain a solution of a phenoxy resin A for an optical material.

Then, a release PET film (A63, thickness: 50 μm, manufactured by Teijin DuPont Films Japan Ltd.) was stuck on a glass plate, and the solution of the phenoxy resin A for an optical material synthesized above was coated on a release treatment surface of the above film by means of a baker type applicator (YBA-4, manufactured by Yoshimitsu Seiki Co., Ltd.) in a gap of 250 μm. Then, the solution was dried in an oven at 60° C. for 10 minutes, 70° C. for 10 minutes, 80° C. for 10 minutes, 100° C. for 10 minutes and 120° C. for 10 minutes. Finally, the solution was further dried 160° C. for 1 hour, and then the PET film was peeled off to obtain a film of the phenoxy resin A for an optical material having a thickness of 45 μm.

Measurement of Refractive Index:

A refractive index of the film of the phenoxy resin A for an optical material obtained above was measured at a temperature of 25° C. and a wavelength of 830 nm by means of a prism coupler (Model 2010, manufactured by Metricon Corporation). The results thereof are shown in Table 1.

Measurement of Average Molecular Weight:

A weight average molecular weight and a number average molecular weight (expressed in term of standard polystyrene in both cases) of the phenoxy resin A for an optical material obtained above were measured by means of GPC (Chromatopack C-R4A, manufactured by Shimadzu Corporation). TSK gel G2000$H_{XL}$/G4000$_{XL}$/G6000$_{XL}$ manufactured by Tosoh Corp. was used for the column.

Measurement of Viscosity:

A viscosity of the phenoxy resin A for an optical material obtained above was measured at a temperature of 25° C. in a N,N-dimethylacetamide solution (solid matter concentration: 40 mass %) by means of an E type viscometer (VISCONIC EHD, manufactured by Tokimec Inc.). The results thereof are shown in Table 1.

Measurement of Glass Transition Temperature:

A glass transition temperature of the phenoxy resin A for an optical material obtained above was measured at a heating rate of 10° C./minute in a measuring temperature range of 30° C.→250° C. by means of DSC (DSC7, manufactured by Perkin Elmer, Inc.). The results thereof are shown in Table 1.

Measurement of 5% Weight Loss Temperature:

A 5% weight loss temperature of the phenoxy resin A for an optical material obtained above was measured at a heating rate of 10° C./minute in a measuring temperature range of 30° C.→600° C. by means of TG-DTA. The results thereof are shown in Table 1.

Example 2

A phenoxy resin B for an optical material was synthesized according to the same method and conditions as in Example 1, except that 63.0 g (epoxy equivalent: 180 g/eq, 0.350 mole in terms of an epoxy group) of a hydrogenated bisphenol F type epoxy resin was used as the difunctional epoxy resin.

A film of the phenoxy resin B for an optical material having a thickness of 50 μm was obtained according to the same method and conditions as in Example 1.

Hereinafter, the refractive index, the average molecular weight, the viscosity, the glass transition temperature and the 5% weight loss temperature were measured according to the same methods and conditions as in Example 1. The results thereof are shown in Table 1.

Example 3

A phenoxy resin C for an optical material was synthesized according to the same method and conditions as in Example 1, except that 55.8 g (0.332 mole in terms of a phenolic hydroxyl group) of bisphenol AF which was fluorine-containing difunctional phenol was used as the difunctional phenol and a stirring time at 120° C. was changed into 7 hours.

A film of the phenoxy resin C for an optical material having a thickness of 50 μm was obtained according to the same method and conditions as in Example 1.

Hereinafter, the refractive index, the average molecular weight, the viscosity, the glass transition temperature and the 5% weight loss temperature were measured according to the same methods and conditions as in Example 1. The results thereof are shown in Table 1.

Example 4

A flask equipped with a cooling tube was charged with 71.4 g (epoxy equivalent: 204 g/eq, 0.350 mole in terms of an epoxy group) of a hydrogenated bisphenol A type epoxy resin, 38.0 g (0.333 mole in terms of a phenolic hydroxyl group) of bisphenol A and 1.24 g (0.010 mole) of 1,5-diazabicyclo[4.3.0]nona-5-ene and charged with N,N-dimethylacetamide which was weighed so that a solid matter concentration in the reaction system was 40 mass %, and they were dissolved.

Then, the temperature in the reaction system was elevated up to 120° C. in an oil bath in one hour while stirring mechanically the above reaction solution, and the solution was stirred at 120° C. for 4 hours and then cooled down to 100° C.

Then, 76.08 g (0.50 mole) of tetrahydrophthalic anhydride was added to the reaction solution, and the mixture was stirred at 100° C. for 5 hours and then cooled down to obtain a solution of a phenoxy resin D for an optical material.

An acid value of the phenoxy resin D for an optical material obtained above was measured to result in finding that it was 95 mg KOH/g. The acid value was calculated from an amount of a 0.1 mol/L potassium hydroxide aqueous solution required for neutralizing the solution of the phenoxy resin D for an optical material. In this case, the neutralization point was determined by a point in which phenolphthalein added as an indicator was changed from a solid color to a pink color.

A film of the phenoxy resin D for an optical material having a thickness of 50 μm was obtained according to the same method and conditions as in Example 1.

Hereinafter, the refractive index, the average molecular weight, the viscosity, the glass transition temperature and the 5% weight loss temperature were measured according to the same methods and conditions as in Example 1. The results thereof are shown in Table 1.

Example 5

A flask equipped with a cooling tube was charged with 71.4 g (epoxy equivalent: 204 g/eq, 0.350 mole in terms of an epoxy group) of a hydrogenated bisphenol A type epoxy resin, 55.8 g (0.332 mole in terms of a phenolic hydroxyl group) of bisphenol AF and 1.24 g (0.010 mole) of 1,5-diazabicyclo[4.3.0]nona-5-ene and charged with N,N-dimethylacetamide which was weighed so that a solid matter concentration in the reaction system was 40 mass %, and they were dissolved.

Then, the temperature in the reaction system was elevated up to 120° C. in an oil bath in one hour while stirring mechanically the above reaction solution, and the solution was stirred at 120° C. for 7 hours and then cooled down to 100° C.

Then, 76.08 g (0.50 mole) of tetrahydrophthalic anhydride was added to the reaction solution, and the mixture was stirred at 100° C. for 5 hours and then cooled down to obtain a solution of a phenoxy resin E for an optical material.

An acid value of the phenoxy resin E for an optical material obtained above was measured to result in finding that it was 90 mg KOH/g.

A film of the phenoxy resin E for an optical material having a thickness of 50 μm was obtained according to the same method and conditions as in Example 1.

Hereinafter, the refractive index, the average molecular weight, the viscosity, the glass transition temperature and the 5% weight loss temperature were measured according to the same methods and conditions as in Example 1. The results thereof are shown in Table 1.

Comparative Example 1

YP-50 (bisphenol A type phenoxy resin) manufactured by Tohto Kasei Co., Ltd. was used as the phenoxy resin to carry out the same evaluation as in Example 1. The results thereof are shown in Table 1. The refractive index at a temperature of 25° C. and a wavelength of 830 nm was 1.582, and it was higher than 1.580.

Comparative Example 2

YP-70 (bisphenol A type/bisphenol F type phenoxy resin) manufactured by Tohto Kasei Co., Ltd. was used as the phenoxy resin to carry out the same evaluation as in Example 1. The results thereof are shown in Table 1. The refractive index at a temperature of 25° C. and a wavelength of 830 nm was 1.590, and it was higher than 1.580.

TABLE 1

| | Example | | | | | Comparative Example | |
|---|---|---|---|---|---|---|---|
| Items | 1 | 2 | 3 | 4 | 5 | 1 | 2 |
| Phenoxy resin | A | B | C | D | E | YP-50 | YP-70 |
| Difunctional epoxy resin | Hydrogenated bisphenol A type epoxy resin | Hydrogenated bisphenol F type epoxy resin | Hydrogenated bisphenol A type epoxy resin | Hydrogenated bisphenol A type epoxy resin | Hydrogenated bisphenol A type epoxy resin | — | — |
| Difunctional phenol | Bisphenol A | Bisphenol A | Bisphenol AF | Bisphenol A | Bisphenol AF | — | — |
| Catalyst | Lithium hydroxide | Lithium hydroxide | Lithium hydroxide | 1,5-diazabicyclo [4.3.0]nona-5-ene | 1,5-diazabicyclo [4.3.0]nona-5-ene | — | — |
| Polybasic acid anhydride | — | — | — | Tetrahydro-phthalic anhydride | Tetrahydro-phthalic anhydride | — | — |
| Refractive index*1 | 1.539 | 1.541 | 1.501 | 1.531 | 1.510 | 1.582 | 1.590 |
| Weight average Molecular weight | 99,600 | 89,800 | 75,400 | 25,600 | 15,500 | 144,600 | 88,700 |
| Solution viscosity (mPa · s)*2 | 4,150 | 1,700 | 1,850 | 900 | 260 | — | — |
| Glass transition temperature (° C.)*3 | 85 | 75 | 103 | 89 | 107 | 95 | 85 |
| 5% weight loss temperature (° C.) | 371 | 365 | 372 | 235 | 230 | 371 | 392 |

*1 wavelength 830 nm, 25° C.
*2 N,N-dimethylacetamide solution having a solid matter concentration of 40 mass %
*3 DSC method Example 6

Preparation of Resin Varnish for Forming a Core Part

A wide mouth plastic bottle was charged with 11 mass parts of (A) the phenoxy resin A for an optical material, 44.5 mass parts of 9,9-bis[4-(2-acryloyloxyethoxy)phenyl]fluorene (A-BPEF, manufactured by Shin-Nakamura Chemical Co., Ltd.) and 44.5 mass parts of bisphenol A type epoxy acrylate (EA-1020, manufactured by Shin-Nakamura Chemical Co., Ltd.) as (B) the polymerizable compound, 2 mass parts of bis(2,4,6-trimethylbenzoyl)phenylphosphine oxide (Irgacure 819, manufactured by Ciba Specialty Chemicals K.K.) as (C) the polymerization initiator and 40 mass parts of ethyl cellosolve as a diluent, and the mixture was stirred for 6 hours on the conditions of a temperature of 25° C. and a rotating speed of 400 rpm by means of a mechanical stirrer, a shaft and a propeller to prepare a resin varnish for forming a core part. Then, the resin varnish was filtrated under pressure through a polyflon filter having a pore diameter of 2 μm (PF020, manufactured by Advantec Toyo Kaisha, Ltd.) on the conditions of a temperature of 25° C. and a pressure of 0.4 MPa, and it was further defoamed under reduced pressure for 15 minutes on the condition of a vacuum degree of 50 mm Hg by means of a vacuum pump and a bell jar.

Preparation of Resin Film for Forming a Core Part:

The resin varnish for forming a core part was applied on a non-treated surface of a PET film (A1517, thickness: 16 μm, manufactured by Toyobo Co., Ltd.) by means of an applicator (Multicoater TM-MC, manufactured by Hirano Tecseed Co., Ltd.) and dried at 80° C. for 10 minutes and then at 100° C. for 10 minutes. Then, a PET film (A31, thickness: 25 μm, manufactured by Teijin DuPont Films Japan Ltd.) was stuck thereon as a protective film to obtain a resin film for forming a core part. In this case, a thickness of the resin layer could optionally be controlled by controlling a gap of the applicator, and it was controlled in the present example so that the film thickness after cured was 50 μm.

Preparation of Resin Varnish for Forming a Cladding Layer:

A wide mouth plastic bottle was charged with 50 mass parts of (A) the phenoxy resin A for an optical material, 50 mass parts of alicyclic diepoxy carboxylate (KRM-2110, manufactured by Adeka Corporation) as (B) the polymerizable compound, 4 mass parts of (C) the polymerization initiator (SP-170, manufactured by Adeka Corporation) and 40 mass parts of ethyl cellosolve as a diluent, and the mixture was stirred for 6 hours on the conditions of a temperature of 25° C. and a rotating speed of 400 rpm by means of a mechanical stirrer, a shaft and a propeller to prepare a resin varnish for forming a cladding layer. Then, the resin varnish was filtrated under pressure through the polyflon filter having a pore diameter of 2 μm (PF020, manufactured by Advantec Toyo Kaisha, Ltd.) on the conditions of a temperature of 25° C. and a pressure of 0.4 MPa, and it was further defoamed under reduced pressure for 15 minutes on the condition of a vacuum degree of 50 mm Hg by means of a vacuum pump and a bell jar.

Preparation of Resin Film for Forming a Cladding Layer:

The resin varnish for forming a cladding layer was applied on a non-treated surface of the PET film (A1517, thickness: 16 μm, manufactured by Toyobo Co., Ltd.) and dried by the same methods as in the resin varnish for forming a core part to obtain a resin film for forming a cladding layer. In the present example, the film thickness after cured was controlled so that it was 30 μm in the case of a resin film for forming a lower cladding layer, 80 μm in the case of a resin film for forming an upper cladding layer and 50 μm in the case of a film for measuring a refractive index and a transmission factor.

Preparation of a Film for Measuring a Refractive Index and a Transmission Factor:

The resin film for forming a core part or the resin film for forming a cladding layer from which the protective film (A31) was removed was laminated on the conditions of a pressure of 0.4 MPa, a temperature of 100° C. and a speed of 0.8 m/minute by means of a roll laminator (HLM-1500, manufactured by Hitachi Plant Techno Co., Ltd.). Next, the film was irradiated with a UV ray (wavelength: 365 nm) at an intensity of 1 $J/cm^2$ by means of a UV ray exposing equipment (MAP-1200-L, manufactured by Dainippon Screen Mfg. Co., Ltd.), and then the PET film (A1517) which was the support film was removed. It was dried at 130° C. for one hour to obtain a cured film having a thickness of 50 μm.

Measurement of a Refractive Index:

A refractive index of the cured film obtained above was measured at a temperature of 25° C. and a wavelength of 830 nm by means of a prism coupler (Model 2010, manufactured by Metricon Corporation). The results thereof are shown in Table 2.

Measurement of a Transmission Factor:

A transmission factor of the cured film obtained above was measured at a temperature of 25° C. and a wavelength of 400 nm by means of a spectrophotometer (U-3410, manufactured by Hitachi, Ltd.). The results thereof are shown in Table 2.

Preparation of Optical Waveguide:

The resin film for forming a lower cladding layer from which the protective film (A31) was removed was laminated on an FR-4 substrate (E-679F, manufactured by Hitachi Chemical Co., Ltd.) on the conditions of a pressure of 0.5 MPa, a temperature of 50° C. and a pressurization time of 30 seconds by means of a vacuum press laminator (MVLP-500, manufactured by Meiki Co., Ltd.). Next, the film was irradiated with a UV ray (wavelength: 365 nm) at an intensity of 1 $J/cm^2$ by means of a UV ray exposing equipment (EXM-1172, manufactured by ORC manufacturing Co., Ltd.), and then the PET film (A1517) which was the support film was removed. Next, it was subjected to heating treatment at 80° C. for 10 minutes to thereby form a lower cladding layer 4.

Next, the resin film for forming a core part was laminated on the above lower cladding layer 4 on the conditions of a pressure of 0.5 MPa, a temperature of 50° C. and a pressurization time of 30 seconds by means of the vacuum press laminator described above.

Then, the film was irradiated with a UV ray (wavelength: 365 nm) at an intensity of 0.5 $J/cm^2$ via a negative type photo mask having a width of 50 Mm by means of the UV ray exposing equipment (MAP-1200-L, manufactured by Dainippon Screen Mfg. Co., Ltd.), and then it was heated after exposed at 80° C. for 5 minutes. Thereafter, the PET film which was the support film was removed, and the core pattern (core part 2) was developed in a developer (ethyl cellosolve/N,N-dimethylacetamide=8/2 mass ratio). Subsequently, it was washed with a washing liquid (isopropanol) and heated and dried at 100° C. for one hour.

Next, the resin film for forming an upper cladding layer obtained above was further laminated thereon by the same method and conditions as in forming the lower cladding layer 4, and it was irradiated with a UV ray (wavelength: 365 nm) at an intensity of 2 $J/cm^2$ by means of the UV ray exposing equipment described above. Thereafter, the PET film (A1517) which was the support film was removed, and it was subjected to heating treatment at 160° C. for one hour, whereby an upper cladding layer 3 was formed to obtain an optical waveguide 1 equipped with a substrate 5 shown in FIG. 1 (*a*). Then, the optical waveguide 1 having a waveguide length of 5 cm was cut out by means of a dicing saw (DAD-341, manufactured by DISCO Corporation).

Measurement of a Transmission Loss:

A transmission loss of the optical waveguide obtained above was measured using VCSEL (FLS-300-01-VCL, manufactured by EXFO Corporation) having a wavelength of 850 nm as a central wavelength which was used for a light source, a light-sensitive sensor (Q82214, manufactured by Advantest Corporation), an incident fiber (GI-50/125 multimode fiber, NA=0.20) and an output fiber (SI-114/125, NA=0.22) by a cut-back method (measuring waveguide lengths: 5, 3 and 2 cm). The results thereof are shown in Table 2 (transmission loss (before reflow)).

Figure 2:
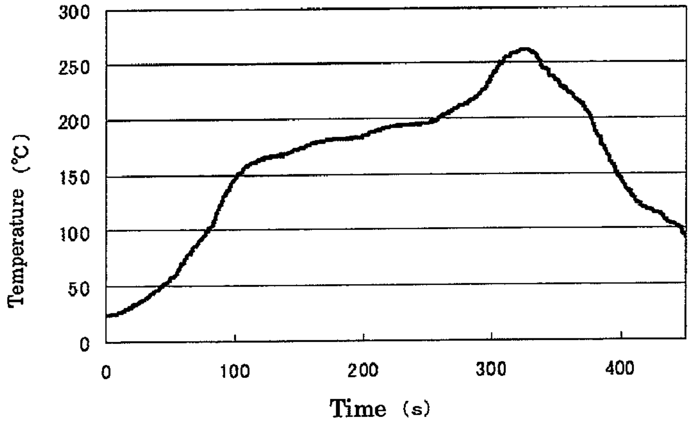
FIG. 2 is a graph showing a temperature profile in a reflow furnace in a reflow test carried out in the present invention.

Reflow Test:

The optical waveguide (waveguide length: 5 cm) obtained above was subjected three times to a reflow test at a maximum temperature of 265° C. on conditions according to JEDE standards (JEDEC JESD22A113E) by means of a reflow tester (Salamander XNA-645PC, manufactured by Furukawa Electric Co., Ltd.). The detailed reflow conditions are shown in Table 3, and the temperature profile in a reflow furnace is shown in FIG. 2.

A transmission loss value of the optical waveguide after subjected to the reflow test was measured using the same light source, light-sensitive sensor, incident fiber and output fiber as described above. The results thereof are shown in Table 2 (transmission loss (after reflow)).

Example 7

The optical waveguide 1 equipped with the substrate 5 shown in FIG. 1 (*a*) was prepared according to the same method and conditions as in Example 6, except that the phenoxy resin A used in Example 6 was changed to the phenoxy resin B.

Hereinafter, the refractive index, the transmission factor and the transmission loss were measured, and the reflow test was carried out according to the same methods and conditions as in Example 6. The results thereof are shown in Table 2.

Example 8

The optical waveguide 1 equipped with the substrate 5 shown in FIG. 1 (*a*) was prepared according to the same method and conditions as in Example 6, except that the phenoxy resin A used in Example 6 was changed to the phenoxy resin C.

Hereinafter, the refractive index, the transmission factor and the transmission loss were measured, and the reflow test was carried out according to the same methods and conditions as in Example 6. The results thereof are shown in Table 2.

Example 9

A wide mouth plastic bottle was charged with 50 mass parts of (A) the phenoxy resin D for an optical material, 25 mass parts of ethoxylated bisphenol A diacrylate (A-BPE-6, manufactured by Shin-Nakamura Chemical Co., Ltd.) and 25 mass parts of p-cumylphenoxy acrylate (A-CMP-1E, manufactured by Shin-Nakamura Chemical Co., Ltd.) as (B) the polymerizable compound, 2 mass parts of bis(2,4,6-trimethylbenzoyl)phenylphosphine oxide (Irgacure 819, manufactured by Ciba Specialty Chemicals K.K.) as (C) the polymerization initiator and 102 mass parts of propylene glycol monomethyl ether acetate as a diluent, and a varnish for forming a core part and a resin film for forming a core part were obtained according to the same methods and conditions as in Example 6.

The optical waveguide 1 equipped with the substrate 5 shown in FIG. 1 (*a*) was prepared according to the same method and conditions as in Example 6, except that the resin film for forming a cladding layer obtained in Example 8 was used as the resin film for forming a cladding layer; a 2.38 mass % tetramethylammonium hydroxide aqueous solution was used as the developer for the core pattern; and purified water was used as the washing liquid for the developer.

Hereinafter, the refractive index, the transmission factor and the transmission loss were measured, and the reflow test was carried out according to the same methods and conditions as in Example 6. The results thereof are shown in Table 2.

Comparative Example 3

An optical waveguide was tried to be prepared according to the same method and conditions as in Example 6, except that a phenoxy resin (YP-50, manufactured by Tohto Kasei Co., Ltd.) was used in place of the phenoxy resin A used in Example 6.

However, peeling and undeveloped parts were brought about in developing the core part, and therefore a core pattern having a width of 50 μm could not be formed, so that the optical waveguide could not be obtained.

Hereinafter, the refractive index and the transmission factor were measured according to the same methods and conditions as in Example 6. The results thereof are shown in Table 2.

TABLE 2

| Items | | Example 6 | Example 7 | Example 8 | Example 9 | Comparative Example 3 |
|---|---|---|---|---|---|---|
| Core pattern having a width of 50 mm | | Formable | Formable | Formable | Formable | Unformable |
| Refractive index*1 | Core | 1.576 | 1.577 | 1.565 | 1.533 | 1.583 |
| | Cladding | 1.522 | 1.523 | 1.510 | 1.510 | 1.548 |
| Transmission factor (%)*2 | Core | 83 | 85 | 84 | 83 | 86 |
| | Cladding | 86 | 84 | 85 | 85 | 87 |
| Transmission loss (dB/cm)*3 | Before reflow | 0.1 | 0.1 | 0.1 | 0.2 | — |
| | After reflow | 0.1 | 0.1 | 0.1 | 0.2 | — |

*1 wavelength 830 nm
*2 wavelength 400 nm
*3 wavelength 850 nm

TABLE 3

| Zone number | 1 | 2 | 3 | 4 | 5 | 6 | 7 |
|---|---|---|---|---|---|---|---|
| Set temperature (° C.) of upper heater | 175 | 195 | 220 | 250 | 280 | 220 | 0 |
| Set temperature (° C.) of lower heater | 175 | 195 | 220 | 250 | 300 | 240 | — |
| Conveyor speed (cm/minute) | | | | 60 | | | |

INDUSTRIAL APPLICABILITY

The phenoxy resin for an optical material according to the present invention has a low refractive index and is excellent in a heat resistance and a transparency.

Further, a resin composition for an optical material containing the above phenoxy resin, a resin film for an optical material comprising the above resin composition and an optical waveguide produced by using the above resin composition and/or the above resin film are excellent as well in a heat resistance and a transparency, and they have a high general versatility and can be applied to the broad fields.

The invention claimed is:

1. A resin composition comprising (A) a phenoxy resin for an optical material, (B) a polymerizable compound, and (C) a polymerization initiator, wherein the resin composition is capable of use in an optical waveguide, wherein the polymerizable compound (B) is at least one compound containing an ethylenically unsaturated group in a molecule thereof, wherein the phenoxy resin for an optical material is obtained by subjecting at least one selected from difunctional epoxy resins represented by the following Formulas (1) to (5) and at least one selected from difunctional phenols represented by the following Formulas (6) to (9) to polyaddition reaction, wherein a film comprising the above phenoxy resin has a refractive index of 1.580 or less at 25° C. and a wavelength of 830 nm:

[Formula 1]

(1)

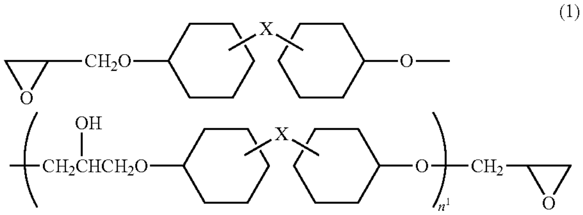

X = $CH_2$, $C(CH_3)_2$, $(CH_2)_m$, $CF_2$, $C(CF_3)_2$, O, S, $SO_2$ (wherein $n^1$ represents an integer of 0 to 5, and m represents an integer of 2 to 10);

[Formula 2]

(2)

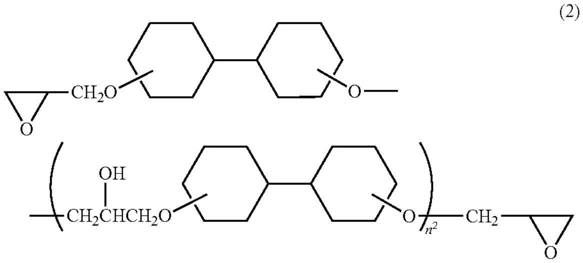

(wherein $n^2$ represents an integer of 0 to 5);

[Formula 3]

(3)

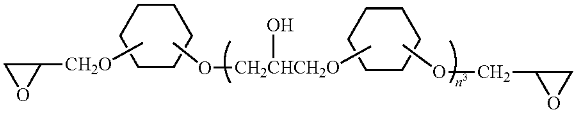

(wherein $n^3$ represents an integer of 0 to 5);

[Formula 4]

(4)

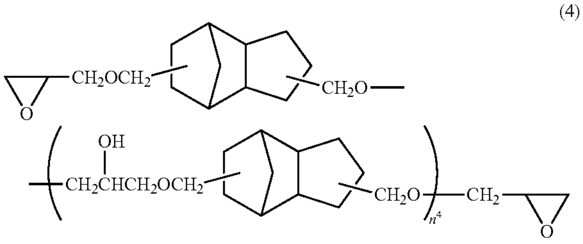

(wherein $n^4$ represents an integer of 0 to 5);

[Formula 5]

(5)

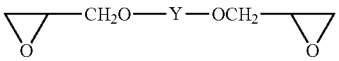

Y = $(CH_2)_p$, $CH_2(CF_2)_pCH_2$, $CH_2C(CH_3)_2CH_2$, $CH_2CH(OH)CH_2$, $(CH_2CH_2O)_q$, $[CH_2CH(CH_3)O]_q$ (wherein p represents an integer of 2 to 10, and q represents an integer of 1 to 5);

[Formula 6]

(6)

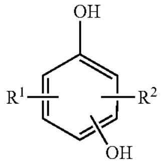

(wherein $R^1$ and $R^2$ each represent independently any of a hydrogen atom, a fluorine atom, an organic group having 1 to 12 carbon atoms and a fluorine-containing organic group having 1 to 12 carbon atoms);

[Formula 7]

(7)

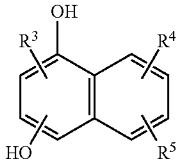

(wherein $R^3$, $R^4$ and $R^5$ each represent independently any of a hydrogen atom, a fluorine atom, an organic group having 1 to 12 carbon atoms and a fluorine-containing organic group having 1 to 12 carbon atoms);

[Formula 8]

(8)

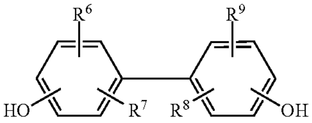

(wherein $R^6$, $R^7$, $R^8$ and $R^9$ each represent independently any of a hydrogen atom, a fluorine atom, an organic group having 1 to 12 carbon atoms and a fluorine-containing organic group having 1 to 12 carbon atoms);

[Formula 9]

(9)

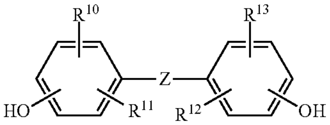

Z= $CH_2$, $C(CH_3)_2$, $(CH_2)_r$, 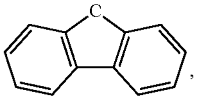 , $CF_2$, $C(CF_3)_2$, O, S, $SO_2$ (wherein $R^{10}$, $R^{11}$, $R^{12}$ and $R^{13}$ each represent independently any of a hydrogen atom, a fluorine atom, an organic group having 1 to 12 carbon atoms and a fluorine-containing organic group having 1 to 12 carbon atoms, and r represents an integer of 2 to 10), and wherein a blending amount of the component (A) is 10 to 85 mass % based on the total amount of the component (A) and the component (B); a blending amount of the component (B) is 15 to 90 mass % based on the total amount of the component (A) and the component (B); and a blending amount of the component (C) is 0.1 to 10 mass % based on the total amount of the component (A) and the component (B).

2. The resin composition as described in claim 1, wherein the difunctional epoxy resin is at least one of a hydrogenated bisphenol A type epoxy resin and a hydrogenated bisphenol F type epoxy resin.

3. The resin composition as described in claim 1, wherein the difunctional phenol is difunctional fluorine-containing phenol.

4. The resin composition as described in claim 1, wherein a polymerization mole ratio of the difunctional epoxy resin to the difunctional phenol is 1.0:0.8 to 1.2.

5. The resin composition as described in claim 1, wherein (A) the phenoxy resin for an optical material is a carboxyl group-containing phenoxy resin that contains a carboxyl group in a molecule thereof, wherein the carboxyl group-containing phenoxy resin is obtained by reacting a phenoxy resin for an optical material with polybasic acid anhydride.

6. The resin composition as described in claim 1, wherein the phenoxy resin has a weight average molecular weight of 1,000 to 2,000,000.

7. The resin composition as described in claim 1, wherein the phenoxy resin has a viscosity of 100 to 30,000 mPa·s at 25° C. in a N,N-dimethylacetamide solution having a solid matter concentration of 40 mass %.

8. The resin composition as described in claim 1, wherein the phenoxy resin has a glass transition temperature of 30 to 400° C.

9. The resin composition as described in claim 1, wherein the phenoxy resin has a 5% weight loss temperature of 150 to 600° C. in the air.

10. The resin composition as described in claim 1, wherein the polymerizable compound (B) is at least one compound containing an ethylenically unsaturated group, and further containing at least one selected from the group consisting of an alicyclic structure, an aryl group, an aryloxy group and an aralkyl group in a molecule thereof.

11. The resin composition as described in claim 1, wherein the polymerization initiator (C) is a photoradical polymerization initiator and/or a photocationic polymerization initiator.

12. The resin composition as described in claim 1, wherein a cured film prepared by polymerizing and curing the resin composition for an optical waveguide described above has a refractive index of 1.300 to 1.600 at 25° C. and a wavelength of 830 nm.

13. The resin composition as described in claim 1, wherein a cured film having a thickness of 50 μm prepared by polymerizing and curing the resin composition for an optical waveguide described above has a transmission factor of 80% or more at 25° C. and a wavelength of 400 nm.

14. A resin film for an optical waveguide comprising the resin composition as described in claim 1.

15. An optical waveguide having a core part and/or a cladding layer formed by using a resin composition comprising (A) a phenoxy resin for an optical material, (B) a polymerizable compound, and (C) a polymerization initiator, wherein the resin composition is capable of use in an optical waveguide, wherein the phenoxy resin for an optical material is obtained by subjecting at least one selected from difunctional epoxy resins represented by the following Formulas (1) to (5) and at least one selected from difunctional phenols represented by the following Formulas (6) to (9) to polyaddition reaction, wherein a film comprising the above phenoxy resin has a refractive index of 1.580 or less at 25° C. and a wavelength of 830 nm:

[Formula 1]

(1)

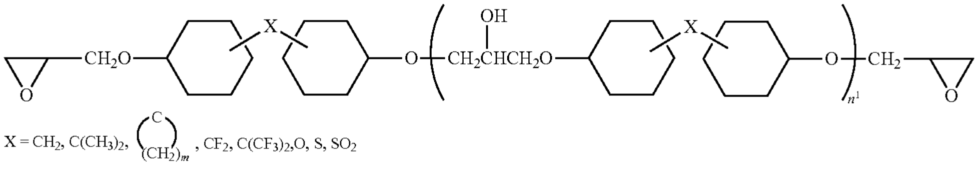

(wherein $n^1$ represents an integer of 0 to 5, and m represents an integer of 2 to 10);

[Formula 2]

(2)

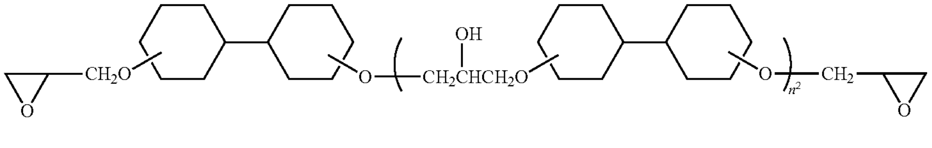

(wherein $n^2$ represents an integer of 0 to 5);

[Formula 3]

(3)

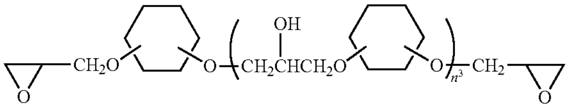

(wherein $n^3$ represents an integer of 0 to 5);

[Formula 4]

(4)

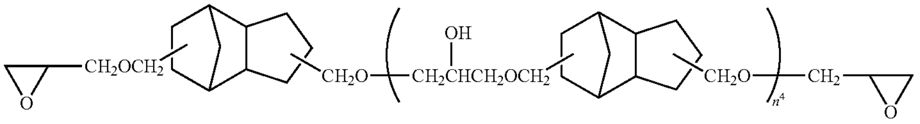

(wherein $n^4$ represents an integer of 0 to 5);

[Formula 5]

(5)

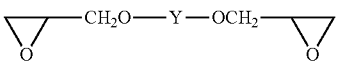

Y = $(CH_2)_p$, $CH_2(CF_2)_pCH_2$, $CH_2C(CH_3)_2CH_2$, $CH_2CH(OH)CH_2$, $(CH_2CH_2O)_q$, $[CH_2CH(CH_3)O]_q$ (wherein p represents an integer of 2 to 10, and q represents an integer of 1 to 5);

[Formula 6]

(6)

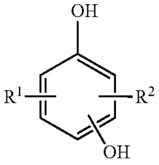

(wherein $R^1$ and $R^2$ each represent independently any of a hydrogen atom, a fluorine atom, an organic group having 1 to 12 carbon atoms and a fluorine-containing organic group having 1 to 12 carbon atoms);

[Formula 7]

(7)

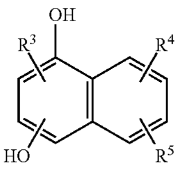

(wherein $R^3$, $R^4$ and $R^5$ each represent independently any of a hydrogen atom, a fluorine atom, an organic group having 1 to 12 carbon atoms and a fluorine-containing organic group having 1 to 12 carbon atoms);

[Formula 8]

(8)

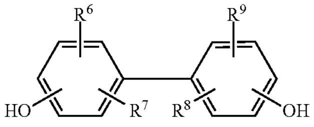

(wherein $R^6$, $R^7$, $R^8$ and $R^9$ each represent independently any of a hydrogen atom, a fluorine atom, an organic group having 1 to 12 carbon atoms and a fluorine-containing organic group having 1 to 12 carbon atoms);

[Formula 9]

(9)

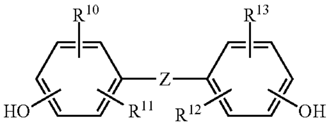

Z= $CH_2$, $C(CH_3)_2$, 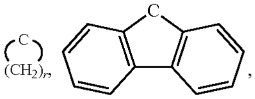 , $CF_2$, $C(CF_3)_2$, O, S, $SO_2$ (wherein $R^{10}$, $R^{11}$, $R^{12}$ and $R^{13}$ each represent independently any of a hydrogen atom, a fluorine atom, an organic group having 1 to 12 carbon atoms and a fluorine-containing organic group having 1 to 12 carbon atoms, and r represents an integer of 2 to 10), and wherein a blending amount of the component (A) is 10 to 85 mass % based on the total amount of the component (A) and the component (B); a blending amount of the component (B) is 15 to 90 mass % based on the total amount of the component (A) and the component (B); and a blending amount of the component (C) is 0.1 to 10 mass % based on the total amount of the component (A) and the component (B).

16. An optical waveguide having a core part and/or a cladding layer formed by using a resin film for an optical waveguide including a resin composition comprising (A) a phenoxy resin for an optical material, (B) a polymerizable compound, and (C) a polymerization initiator, wherein the resin composition is capable of use in an optical waveguide, wherein the phenoxy resin for an optical material is obtained by subjecting at least one selected from difunctional epoxy resins represented by the following Formulas (1) to (5) and at least one selected from difunctional phenols represented by the following Formulas (6) to (9) to polyaddition reaction, wherein a film comprising the above phenoxy resin has a refractive index of 1.580 or less at 25° C. and a wavelength of 830 nm:

[Formula 1]

(1)

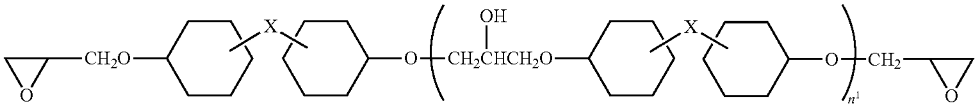

X = $CH_2$, $C(CH_3)_2$, 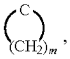 , $CF_2$, $C(CF_3)_2$, O, S, $SO_2$ (wherein $n^1$ represents an integer of 0 to 5, and m represents an integer of 2 to 10);

[Formula 2]

(2)

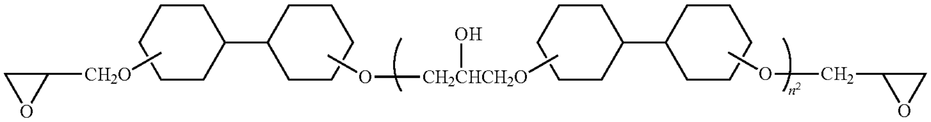

(wherein $n^2$ represents an integer of 0 to 5);

[Formula 3]

(3)

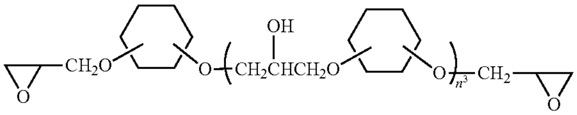

(wherein $n^3$ represents an integer of 0 to 5);

[Formula 4]

(4)

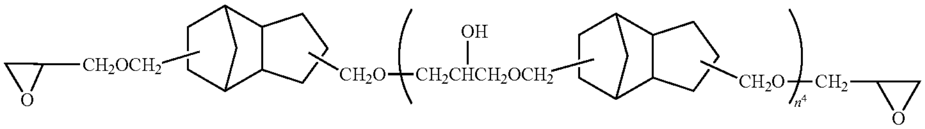

(wherein $n^4$ represents an integer of 0 to 5);

[Formula 5]

(5)

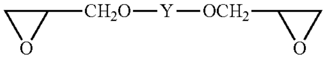

Y = $(CH_2)_p$, $CH_2(CF_2)_pCH_2$, $CH_2C(CH_3)_2CH_2$, $CH_2CH(OH)CH_2$, $(CH_2CH_2O)_q$, $[CH_2CH(CH_3)O]_q$ (wherein p represents an integer of 2 to 10, and q represents an integer of 1 to 5);

[Formula 6]

(6)

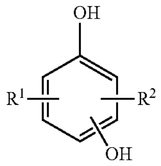

(wherein $R^1$ and $R^2$ each represent independently any of a hydrogen atom, a fluorine atom, an organic group having 1 to 12 carbon atoms and a fluorine-containing organic group having 1 to 12 carbon atoms);

[Formula 7]

(7)

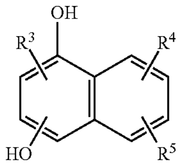

(wherein $R^3$, $R^4$ and $R^5$ each represent independently any of a hydrogen atom, a fluorine atom, an organic group having 1 to 12 carbon atoms and a fluorine-containing organic group having 1 to 12 carbon atoms);

[Formula 8]

(8)

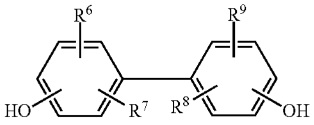

(wherein $R^6$, $R^7$, $R^8$ and $R^9$ each represent independently any of a hydrogen atom, a fluorine atom, an organic group having 1 to 12 carbon atoms and a fluorine-containing organic group having 1 to 12 carbon atoms);

[Formula 9]

(9)

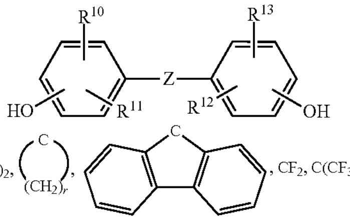

Z = $CH_2$, $C(CH_3)_2$, , , $CF_2$, $C(CF_3)_2$, O, S, $SO_2$ (wherein $R^{10}$, $R^{11}$, $R^{12}$ and $R^{13}$ each represent independently any of a hydrogen atom, a fluorine atom, an organic group having 1 to 12 carbon atoms and a fluorine-containing organic group having 1 to 12 carbon atoms, and r represents an integer of 2 to 10), and wherein a blending amount of the component (A) is 10 to 85 mass % based on the total amount of the component (A) and the component (B); a blending amount of the component (B) is 15 to 90 mass % based on the total amount of the component (A) and the component (B); and a blending amount of the component (C) is 0.1 to 10 mass % based on the total amount of the component (A) and the component (B).

17. The optical waveguide as described in claim 15, wherein the optical waveguide has an optical transmission loss of 0.3 dB/cm or less.

18. The optical waveguide as described in claim 15, wherein the optical waveguide has an optical transmission loss of 0.3 dB/cm or less after carrying out three times a reflow test at a maximum temperature of 265° C.

19. The resin composition as described in claim 6, wherein the weight average molecular weight of the phenoxy resin is 10,000 to 2,000,000.

20. The resin composition as described in claim 7, the viscosity of the phenoxy resin is 500 to 30,000 mPa·s at 25° C. in a N,N-dimethylacetamide solution having a solid matter concentration of 40 mass %.

21. The resin composition as described in claim 9, wherein the phenoxy resin has a 5% weight loss temperature of 200 to 600° C. in the air.

22. The resin composition as described in claim 1, wherein said at least one compound containing an ethylenically unsaturated group is selected from the group consisting of (meth) acrylates, vinylidene halides, vinyl ethers, vinyl esters, vinylpyridine, vinylamide, and aryl vinyls.

23. The resin composition as described in claim 1, wherein said at least one compound containing an ethylenically unsaturated group is selected from the group consisting of (meth) acrylates and aryl vinyls.

* * * * *